(12) United States Patent
Gorbet et al.

(10) Patent No.: US 6,880,755 B2
(45) Date of Patent: Apr. 19, 2005

(54) METHOD AND APPARATUS FOR DISPLAY OF SPATIALLY REGISTERED INFORMATION USING EMBEDDED DATA

(75) Inventors: Matthew G. Gorbet, San Francisco, CA (US); L. Noah Flores, Woodside, CA (US); David L. Hecht, Palo Alto, CA (US); Shilajeet Banerjee, Menlo Park, CA (US)

(73) Assignee: Xerox Coporation, Stamford, CT (US)

( * ) Notice: Subject to any disclaimer, the term of this patent is extended or adjusted under 35 U.S.C. 154(b) by 0 days.

(21) Appl. No.: 09/454,526

(22) Filed: Dec. 6, 1999

(65) Prior Publication Data

US 2002/0121550 A1 Sep. 5, 2002

(51) Int. Cl.[7] ................................................ G06K 7/10
(52) U.S. Cl. ....................................................... 235/454
(58) Field of Search ................................ 235/487, 492, 235/435, 439, 454, 494; 382/312, 232, 233, 100

(56) References Cited

U.S. PATENT DOCUMENTS

| | | | |
|---|---|---|---|
| 4,641,244 A | | 2/1987 | Wilson et al. ............... 364/475 |
| 4,679,154 A | * | 7/1987 | Blanford ...................... 186/61 |
| 4,803,737 A | | 2/1989 | Sato et al. ..................... 382/65 |

(Continued)

FOREIGN PATENT DOCUMENTS

| | | |
|---|---|---|
| EP | 0 254 644 A2 | 1/1988 |
| EP | 0 469 864 | 5/1992 |
| EP | 0 923 050 A2 | 6/1999 |
| JP | 2000059794 A | 2/2000 |
| JP | 2000099257 A * | 4/2000 |
| WO | WO 00/73981 A1 | 12/2000 |
| WO | WO 01/01670 A1 | 1/2001 |

OTHER PUBLICATIONS

B. Ullmer, et al., "The metaDESK: Models and Prototypes for Tangible User Interfaces," Proceedings of UIST '97, Oct. 14–17, 1997, ACM, pp. 1–10.

D. Schmalstieg, et al., "Using Transparent Props For Interaction With The Virtual Table," 1999 Symposium on Interactive 3D Graphics, Atlanta GA, USA, ACM, pp. 147–153, and 232.

EP Search Report for application EP 00 31 0774 (U.S. Counterparts 09/454,526, 09/455,304 and 09/456,105) dated Apr. 25, 2003.

*Primary Examiner*—Michael G. Lee
*Assistant Examiner*—Jamara A. Franklin

(57) ABSTRACT

A viewport lens displays registered information registered using embedded data. An image capture device captures an image from the substrate that includes embedded data. The embedded data in the captured image is decoded to create information regarding the substrate, such as location, orientation, or a label. Based on the information regarding the substrate, information is generated that is registered with the substrate. In one embodiment, the information is registered with the substrate by optically combining the generated information with substrate information in a viewport lens.

12 Claims, 27 Drawing Sheets

U.S. PATENT DOCUMENTS

| | | | |
|---|---|---|---|
| 4,906,843 A | 3/1990 | Jones et al. | 250/221 |
| 4,985,930 A | 1/1991 | Takeda et al. | 382/56 |
| 5,091,966 A | 2/1992 | Bloomberg et al. | 382/21 |
| 5,444,779 A | 8/1995 | Daniele | 399/366 |
| 5,513,264 A | 4/1996 | Wang et al. | 380/51 |
| 5,521,372 A | 5/1996 | Hecht et al. | 235/494 |
| 5,594,809 A | 1/1997 | Kopec et al. | 382/161 |
| 5,625,765 A | 4/1997 | Ellenby et al. | 345/633 |
| 5,633,489 A | 5/1997 | Dvorkis et al. | 235/462.43 |
| 5,636,292 A | 6/1997 | Rhoads | 382/232 |
| 5,637,849 A | 6/1997 | Wang et al. | 235/454 |
| 5,765,176 A | 6/1998 | Bloomberg | 707/514 |
| 5,825,933 A | 10/1998 | Hecht | 382/243 |
| 5,862,270 A | 1/1999 | Lopresti et al. | 382/306 |
| 5,870,499 A | 2/1999 | Bender et al. | 382/232 |
| 5,905,819 A | 5/1999 | Daly | 382/284 |
| 5,945,661 A | 8/1999 | Nukui et al. | 235/462.45 |
| 5,951,056 A | 9/1999 | Fukuda et al. | 283/93 |
| 5,988,505 A | 11/1999 | Shellhammer | 235/462.09 |
| 5,994,710 A | 11/1999 | Knee et al. | 250/557 |
| 6,036,094 A | 3/2000 | Goldman et al. | 235/462.45 |
| 6,037,936 A | 3/2000 | Ellenby et al. | 345/764 |
| 6,122,403 A * | 9/2000 | Rhoads | 382/233 |
| 6,141,441 A * | 10/2000 | Cass et al. | 382/166 |
| 6,176,427 B1 | 1/2001 | Antognini et al. | 235/454 |
| 6,192,138 B1 * | 2/2001 | Yamadaji | 382/100 |
| 6,201,879 B1 * | 3/2001 | Bender et al. | 382/100 |
| 6,201,901 B1 | 3/2001 | Zhou et al. | 382/306 |
| 6,275,621 B1 | 8/2001 | Terry | 382/289 |
| 6,327,395 B1 | 12/2001 | Hecht et al. | 382/306 |
| 6,360,948 B1 | 3/2002 | Yang et al. | 235/462.1 |
| 6,400,834 B1 | 6/2002 | Murphy | 382/112 |

* cited by examiner

| B | B | B | B | B | B | B | B | B | B | B | B | B | B |
|---|---|---|---|---|---|---|---|---|---|---|---|---|---|
| B | X | X | X | E | E | d | 0 | E | E | X | X | X | B |
| B | X | X | E | 1 | 0 | d | 1 | 0 | 0 | 1 | E | X | B |
| B | X | E | 1 | 0 | 0 | d | 1 | 1 | 1 | 0 | E | X | B |
| B | E | 0 | 1 | (0) | 0 | d | 0 | 1 | 1 | 0 | 0 | E | B |
| B | E | 0 | 0 | 1 | 1 | d | 1 | 0 | [1] | 1 | 0 | d | B |
| B | 0 | 0 | 0 | 0 | 1 | (d) | 0 | 1 | 0 | 1 | 1 | d | B |
| B | 0 | 1 | 1 | 1 | 1 | d | [1] | 1 | 0 | 0 | 0 | d | B |
| B | E | 1 | 0 | 0 | 0 | d | 1 | (0) | 0 | 1 | 0 | d | B |
| B | E | 1 | 1 | 0 | [1] | d | 0 | 0 | 0 | 1 | 1 | E | B |
| B | X | 1 | 0 | 1 | 0 | d | 0 | 0 | 1 | (0) | E | X | B |
| B | X | E | [1] | 1 | 0 | d | 0 | 1 | 1 | 1 | E | X | B |
| B | X | X | X | E | 0 | d | 0 | 0 | E | E | X | X | B |
| B | B | B | B | B | B | B | B | B | B | B | B | B | B |

*FIG. 25*

METHOD AND APPARATUS FOR DISPLAY OF SPATIALLY REGISTERED INFORMATION USING EMBEDDED DATA

CROSS-REFERENCE TO RELATED APPLICATIONS

This application is related to U.S. patent application Ser. No. 09/455,304, entitled METHOD AND APPARATUS FOR DECODING ANGULAR ORIENTATION OF LATTICE CODES, and is related to U.S. patent application Ser. No. 09/456,105, entitled METHOD AND APPARATUS FOR SPATIALLY REGISTERING INFORMATION USING EMBEDDED DATA, filed concurrently herewith.

BACKGROUND OF THE INVENTION

Apparatus, methods, and articles of manufacture consistent with the invention relate generally to spatial registration of information, and in particular to capturing an image of first information having embedded data, decoding the embedded data in the captured image, retrieving second information based on the decoding, and spatially registering the second information with respect to the first information.

It is often useful to register a first set of information with a second set of information. Augmented reality, for example, is implemented by creating a composite view of physical reality registered with computer-generated information related to the physical reality. In an augmented reality system, a first set of information, such as an image of physical reality, may be registered with a second set of information, such as information related to the image of physical reality.

One conventional approach to creating augmented reality is to capture an image of a physical scene, identify objects in the scene using a scene recognition algorithm, retrieve information based on the identified objects, and create a combined display of an image of the physical scene and information related to the identified objects, thus augmenting the physical scene. One drawback of such a system is that a large amount of processing power is required to execute the scene recognition algorithm, especially when it must differentiate between many different objects of a scene, and identify the location of the objects in the scene. Identifying the location of the objects allows the retrieved information to be placed at a location in the composite display that is registered with the identified object. The retrieved information is "registered" by spatially relating the retrieved information to the identified object. Another drawback is that registration generally cannot be determined from a partial capture of the scene.

What is needed is a system capable of registering first and second information that does not suffer from the limitations of conventional systems.

SUMMARY OF THE INVENTION

Apparatus, methods, and articles of manufacture consistent with the present invention provide a registration scheme wherein a first set of information on a substrate having embedded data embodied thereon is registered with a second set of information, based on the embedded data. In accordance with this registration scheme, an image capture device captures an image that includes embedded code and causes a display to be created that includes a combination of the captured image and information that augments the image with additional information. The additional information is registered with the captured image in the combined display.

In accordance with the principles of the invention, an image capture device captures an image from the substrate that includes embedded data. The embedded data in the captured image is decoded to create information regarding the substrate, such as location, orientation, or a label. Based on the information regarding the substrate, information is generated that is registered with the substrate. In one embodiment, the information is registered with the substrate by optically combining the generated information with substrate information in a viewport lens.

Additional objects and advantages of the invention will be set forth in part in the description which follows, and in part will be clear from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

FIG. 22 illustrates an embodiment of address codes encoded in a portion of a glyph address carpet;

FIG. 25 illustrates a binary data matrix formed from a glyph lattice;

DETAILED DESCRIPTION OF THE INVENTION

Reference will now be made in detail to embodiments of the invention, examples of which are illustrated in the accompanying drawings. Methods, apparatus, and articles of manufacture disclosed herein consistent with the principles of the invention register first information having embedded data with second information.

Figure 1:
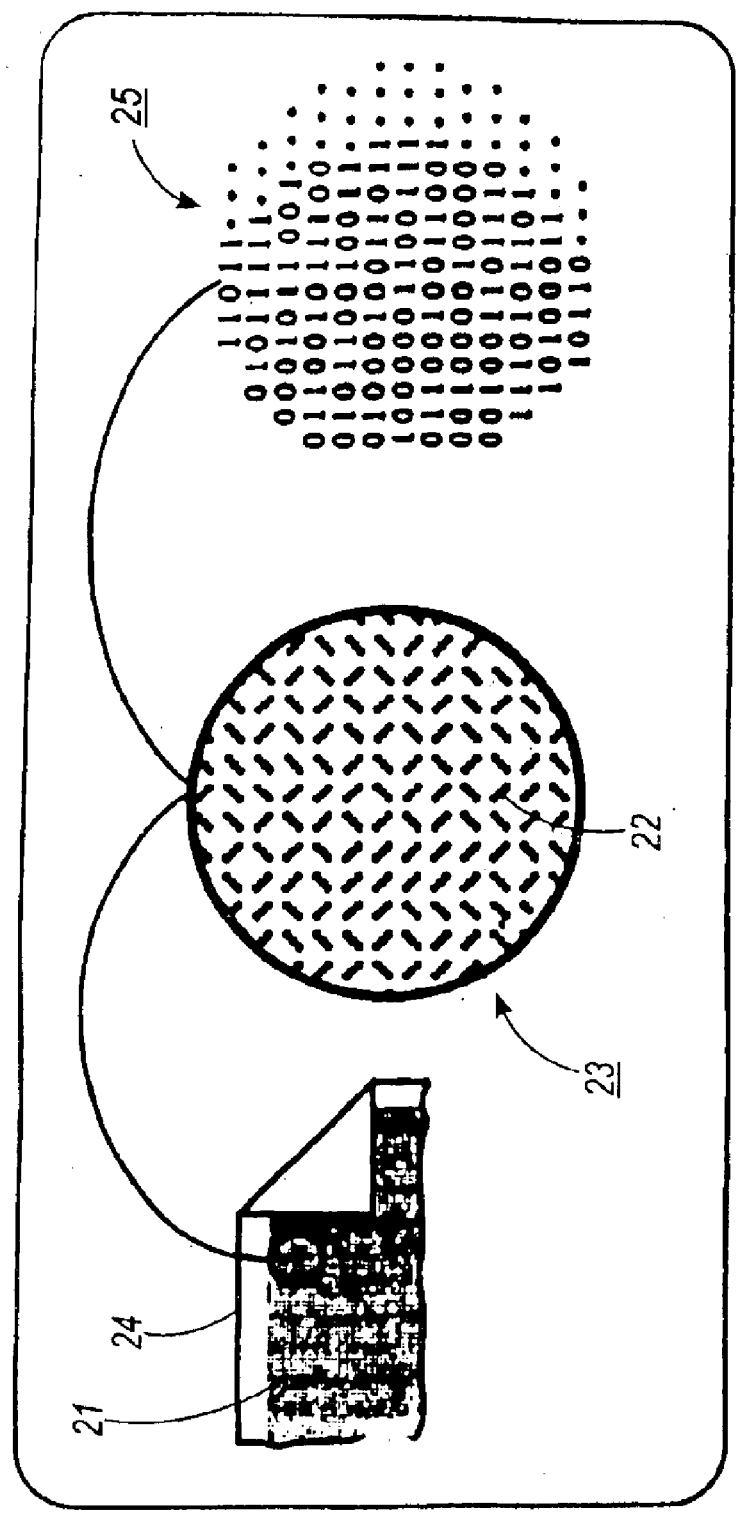
FIG. 1 illustrates an overview of the properties of glyph marks and codes embodied in the glyph marks.

FIG. 1 illustrates glyph marks and codes embodied in the glyph marks. Glyph marks are typically implemented as a fine pattern on a substrate, such as glyph marks 21 on substrate 24. Glyph marks are not easily resolved by the unaided human eye. Thus, glyph marks typically appear to the unaided eye as having a uniform gray scale appearance or texture, as illustrated by glyph marks 21 in FIG. 1.

Enlarged area 23 shows an area of glyph marks 21. Glyph marks 21 are comprised of elongated slash-like marks, such as glyph 22, and are typically distributed evenly widthwise and lengthwise on a lattice of glyph center points to form a rectangular pattern of glyphs. Glyphs are usually tilted backward or forward, representing the binary values of "0" or "1," respectively. For example, glyphs may be tilted at +45° or –45° with respect to the longitudinal dimension of substrate 24. Using these binary properties, the glyph marks can be used to create a series of glyph marks representing 0's and 1's embodying a particular coding system.

The glyph marks of enlarged area 23 can be read by an image capture device. The captured image of glyph marks can then be decoded into 0's and 1's by a decoding device. Decoding the glyphs into 0's and 1's creates a glyph code pattern 25. The 0's and 1's of glyph code pattern 25 can be further decoded in accordance with the particular coding system used to create glyph marks 21. Additional processing might be necessary in the decoding stage to resolve ambiguities created by distorted or erased glyphs.

Glyph marks can be implemented in many ways. Apparatus and methods consistent with the invention read and decode various types of glyph code implementations. For example, glyphs can be combined with graphics or may be used as halftones for creating images.

Figure 2:
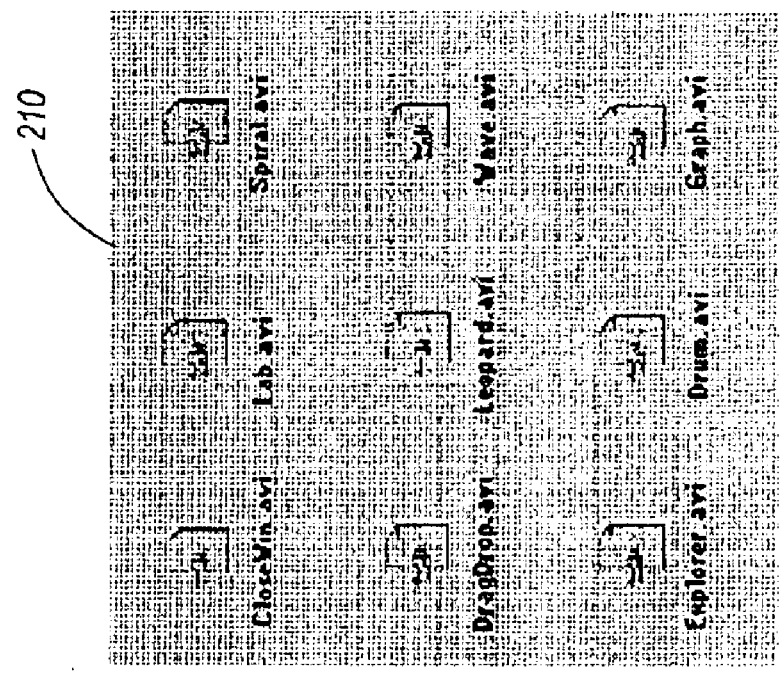
FIG. 2 illustrates an embodiment of an image combining graphics and glyphs consistent with the present invention.

FIG. 2 illustrates an embodiment of an image 210 combining graphics and glyphs consistent with the present invention. In this particular embodiment, the graphics comprise user interface icons. Each icon comprises a graphic overlaid on glyphs. The glyphs form an address carpet. The glyph address carpet establishes a unique address space of positions and orientations for the image by appropriate coding of the glyph values.

Figure 3:
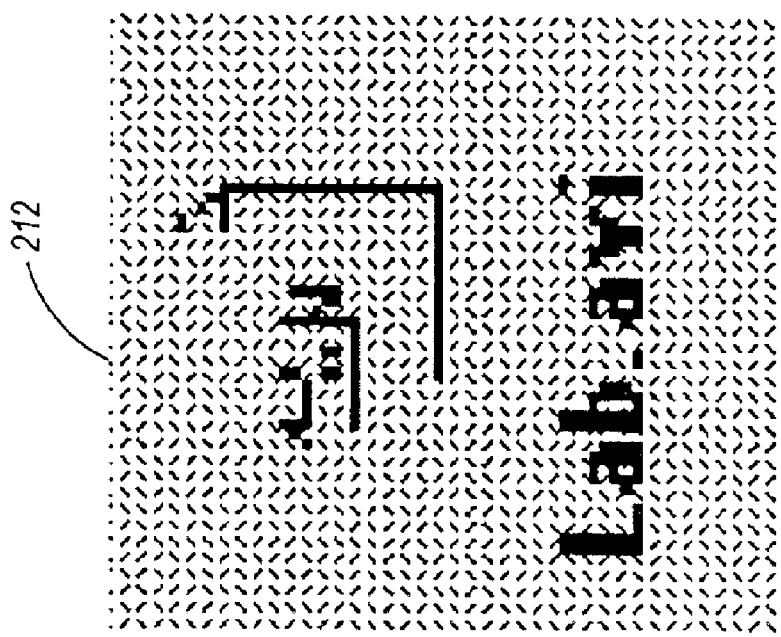
FIG. 3 illustrates an enlarged view of a portion of the image illustrated in FIG. 2.

FIG. 3 illustrates an enlarged view of a portion of image 210 illustrated in FIG. 2. More particularly, portion 212 illustrates the Lab.avi icon overlaying a portion of the address carpet, which unambiguously identifies the icon location and orientation.

Figure 4:
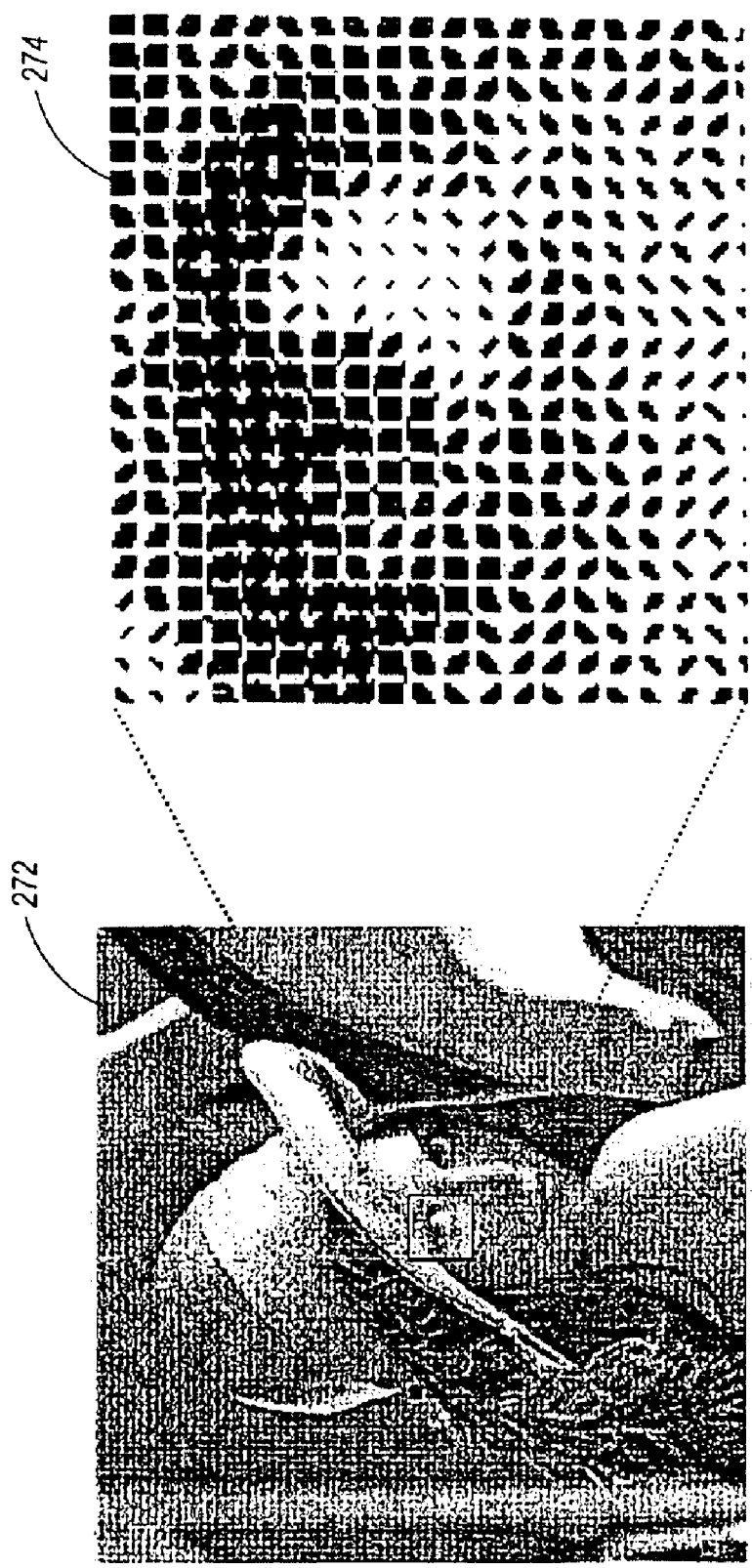
FIG. 4 illustrates an image of a pictorial comprising glyphtones consistent with the principles of the present invention.

FIG. 4 illustrates an image of a pictorial comprising glyphtones consistent with the present invention. Glyphtones are halftone cells having area-modulated glyphs that can be used to create halftone images incorporating a glyph code.

Figure 5:
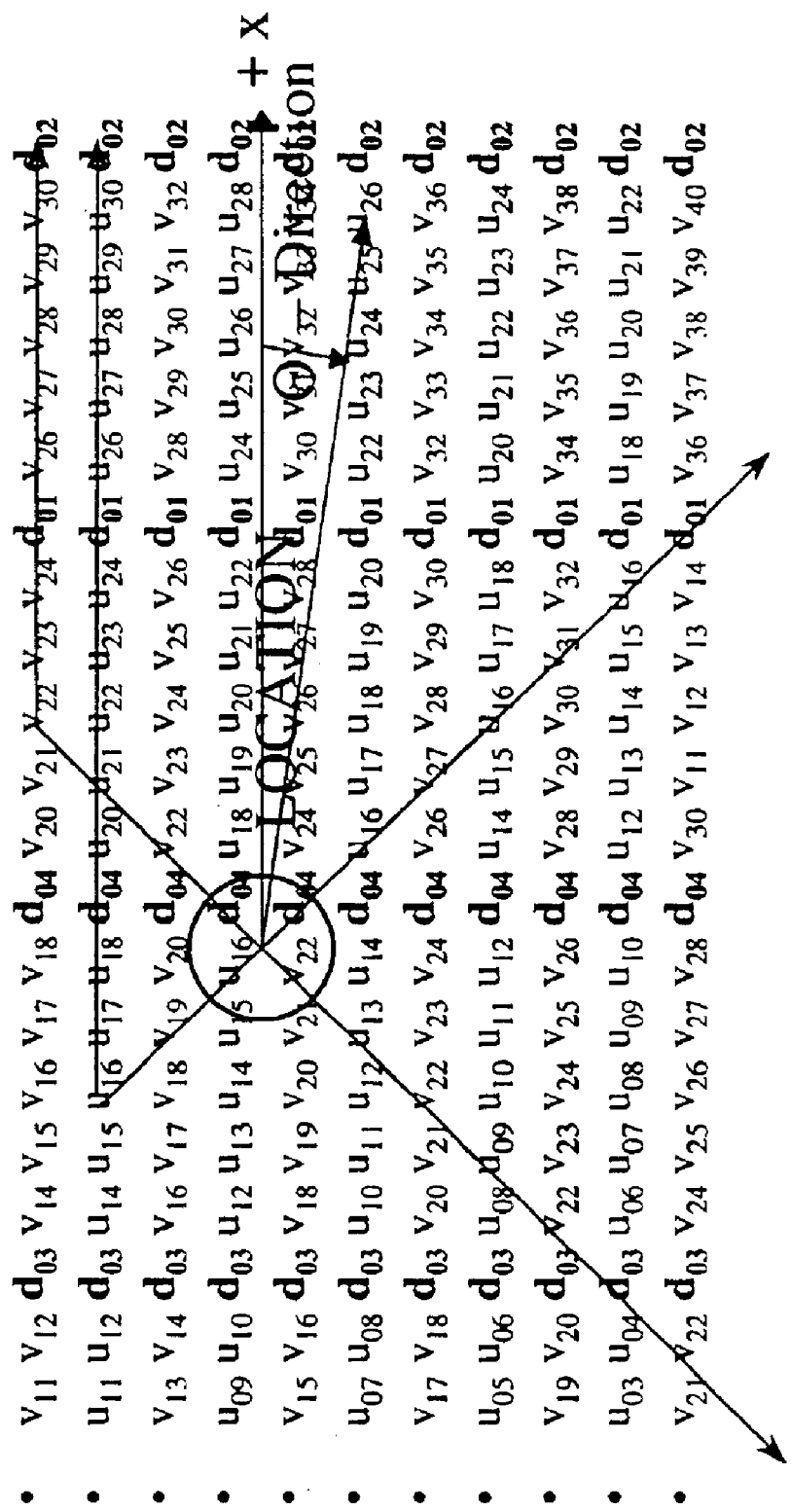
FIG. 5 illustrates an example of a portion of a glyph address carpet code with overlay tiled label code.

FIG. 5 illustrates an example of a portion of a glyph address carpet code with overlay tiled label code. The u and v glyph address codes comprise the address carpet, and the d codes comprise the overlay tiled label code. In this embodiment, rows of u address codes are interleaved with rows of v codes. Each row of u address codes is offset by two positions so that a diagonal line running down and to the right at 45° cuts across identical u codes in every other row. Similarly, each row of v address codes is offset by two positions so that a diagonal line running down and to the left at 45° cuts across identical v codes in every other row. This property of the u and v address codes allows determination of the precise location within the code from a captured image of glyphs.

Every sixth column of the address carpet is substituted by d codes, which comprise a label code. A label code may represent additional information, such as a page number of context. The label code in FIG. 5 is a four-bit label code, comprising bits $d_{o1}$, $d_{o2}$, $d_{o3}$, and $d_{o4}$. The d codes repeat throughout the address carpet. The d codes substitute for u and v codes. For example, in the top row, $v_{13}$, $v_{19}$, $v_{25}$, and $v_{31}$ are substituted for $d_{o3}$, $d_{o4}$, $d_{o1}$, and $d_{o2}$, respectively. In each row, the u and v codes in every sixth column are over written by corresponding d codes. In a captured portion of the address carpet, the d codes can be decoded to provide a label providing information. The d codes could represent, for example, a page number or context information. Thus, if the portion of glyph address carpet illustrated in FIG. 5 were read, codes $d_{o3}$, $d_{o4}$, $d_{o1}$, and $d_{o2}$ respectively represented 1, 1, 0, 0, the reordered d codes would form a code of $d_{o1}$, $d_{o2}$, $d_{o3}$, and $d_{o4}$, a code of 0011, indicating page or context three (binary 0011=3). The proper logical identity of the code elements (i.e., addressing) is provided by the address code.

From the captured portion of the glyph address carpet code having overlay tiled label code as illustrated in FIG. 5, orientation, location, and a label can be determined. The u and v address codes can be used to determine position, as will be explained in greater detail below, and the d codes provide label information.

Apparatus and methods consistent with the invention read embedded data from a substrate, decode the embedded data to determine registration of the substrate relative to a reference in an apparatus, and develop and present human-sensible information based on the registration information. In one embodiment, the human-sensible information is visual information registered with the substrate. The human-sensible information may also comprise, for example, tactile, audible, or other sensory information.

Figure 6:
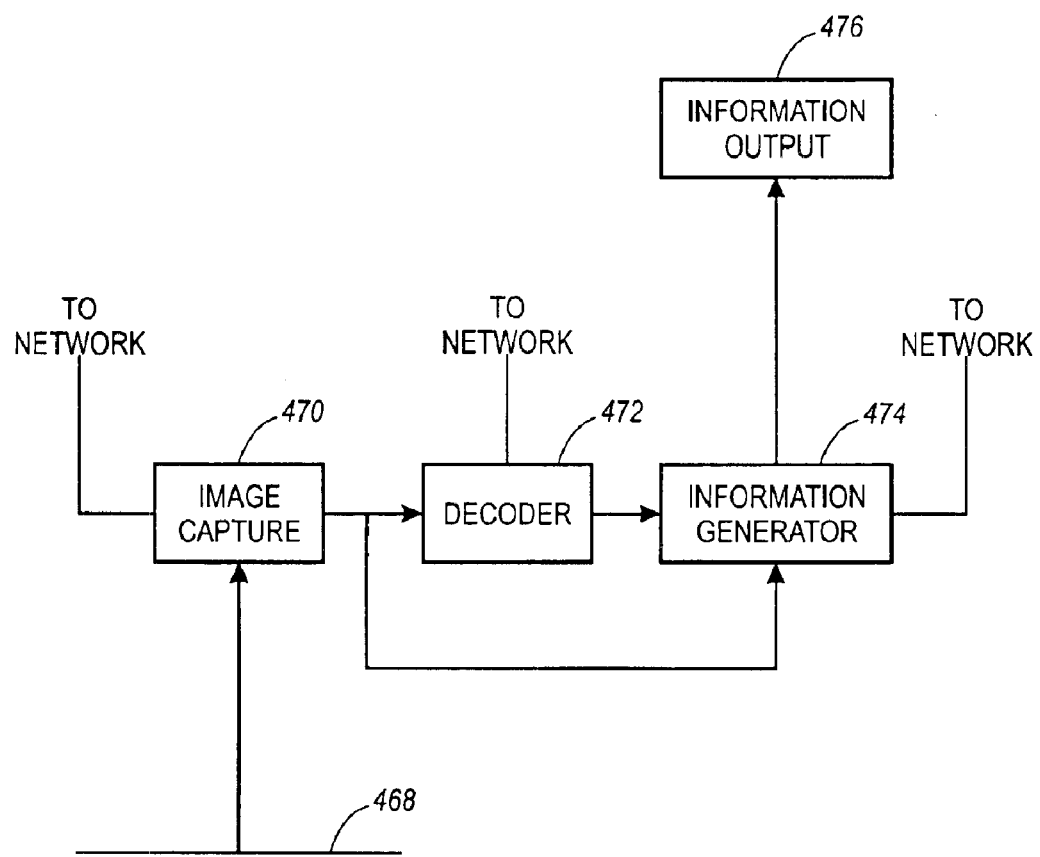
FIG. 6 illustrates a system for reading an image having embedded data, decoding the embedded data in the image, and developing human-sensible information based on the decoded embedded data.

FIG. 6 illustrates a system for reading an image having embedded data, decoding the embedded data in the image, and developing human-sensible information based on the decoded embedded data. More particularly, image capture 470 reads substrate 468 to capture an image having embedded data, decoder 427 decodes the embedded data in the captured image, and information generator 474 develops human-sensible information based on the decoded embedded data, and outputs the information to information output 476, which represents one or more information output devices. The human-sensible information may be visual information registered with substrate 468, and additionally or alternatively may comprise other human-sensible information, such as tactile, audible, or other human-sensible information.

Figure 7:
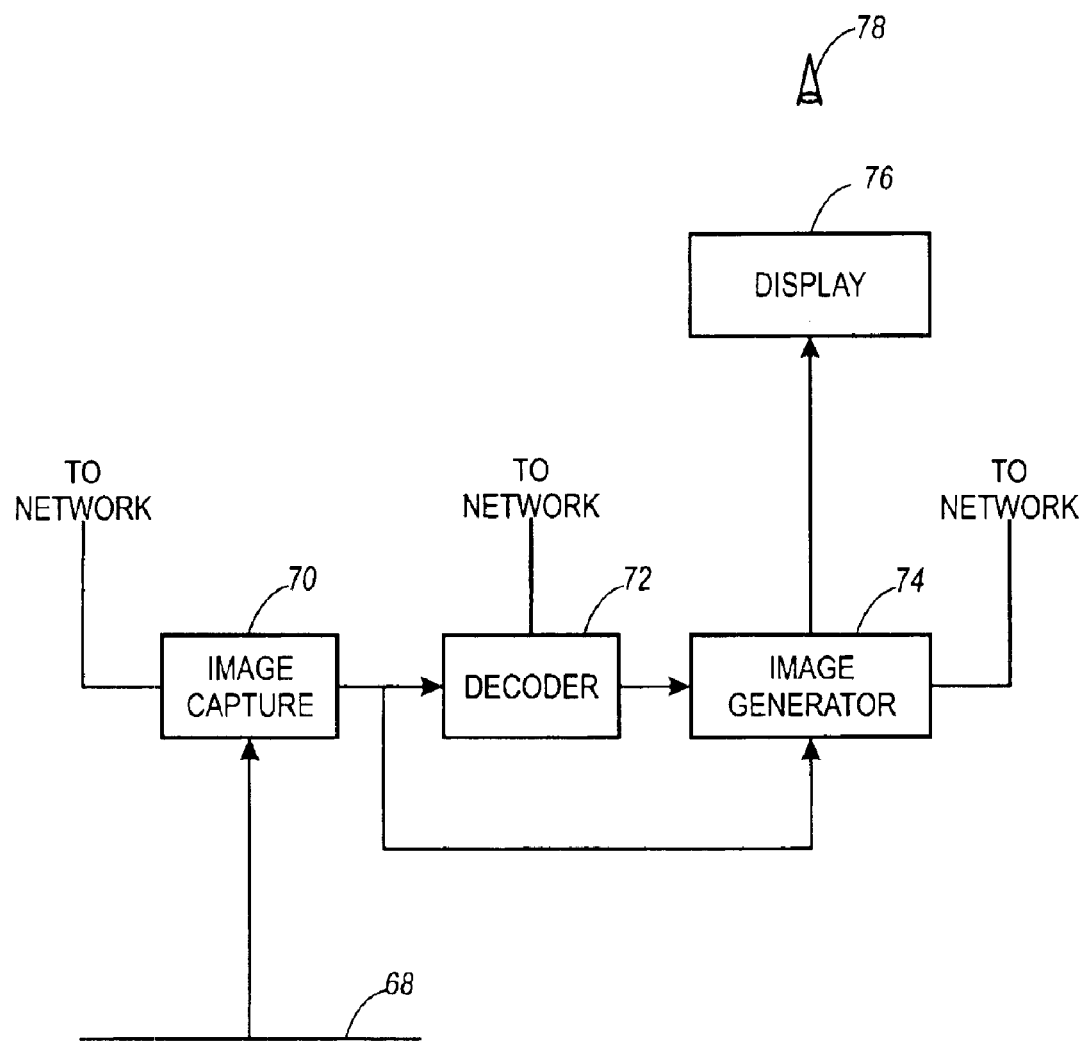
FIG. 7 illustrates a logical configuration of elements consistent with principles of the present invention.

FIG. 7 is a block diagram illustrating a logical configuration of elements in accordance with principles consistent with the invention. An image capture device 70 captures an image from la substrate 68. Substrate 68 has embedded data, such as glyphs embodied thereon. Image capture device 70 transfers the captured substrate image to a decoder 72 and an image generator 74. In one embodiment, the embedded data on substrate 68 comprises an address carpet and tiled label code. Decoder 72 analyzes the embedded data in the captured substrate image to determine information regarding the registration of the substrate, such as orientation, location, and label information. These results are transferred to image generator 74 for further processing.

Image generator 74 processes the results from decoder 72 and the captured substrate image from image capture device 70. In one embodiment, image generator 74 receives a context code, a location code, and a rotation code from decoder 72. The context code defines a particular context of substrate 68, such as a substrate page number. The location code defines the location on substrate 68 where the captured image was taken from. The rotation gives the orientation of the substrate relative to the image capture device. Using the context code and location code, image generator 74 accesses information related to the context code and location code. For example, if the context code represents substrate page iv, location code indicates location coordinates x=97 and y=92, and rotation=43°, image generator 74 retrieves corresponding information and generates an image registered to the substrate. The rotation code enables registering the orientation of the generated image.

In one embodiment, the retrieved information includes two types of information: image information in the form of a bit map image representation of substrate page iv, and icon information defining the locations and meaning of icons on substrate page iv. Using this information, if the user observes an icon in display 76 that is desired to be selected, the user can provide a selection signal. In response, a system (not shown) attached to the registration system of FIG. 7 can use the retrieved meaning of the icon to perform functions corresponding to the icon, as a conventional system would in response to user selection of an icon on a user interface in a conventional display.

The size of the retrieved information may vary. In one embodiment, image generator 74 retrieves an image of substrate 68 that is the same size as the footprint of display 76 and corresponds to the area of substrate 68 directly under the footprint of display 76. Because display 76 is aligned with substrate 68, observer 78 looking at display 76 is given the illusion of looking directly onto substrate 68. Image generator 74 may also add information to the image, or alter the retrieved image before sending it to display 76.

The image sent to display 76 may be generated by image generator 74 in many ways. For example, image generator 74 may merely pass on the image captured by image capture 70, or a representation of the image captured by image capture 70. For example, a bitmap representation of the entire substrate 68 could be stored locally in image generator 74 or on a remote device, such as a device on a network. In one embodiment, in response to receiving codes from decoder 72, image generator 74 retrieves an area corresponding to the codes from the bitmap representation, and forwards the area representation to display 76 for display to a user. The area representation retrieved by image generator 74 may be the same size as the image captured by image capture 70, or may be an extended view, including not only a representation of the captured area, but also a representation of an area outside the captured area. The extended view approach only requires image capture 70 to be as large as is necessary to capture an image from substrate 68 that is large enough for the codes to be derived, yet still provides a perception to the user of seeing a larger area.

Figure 8:
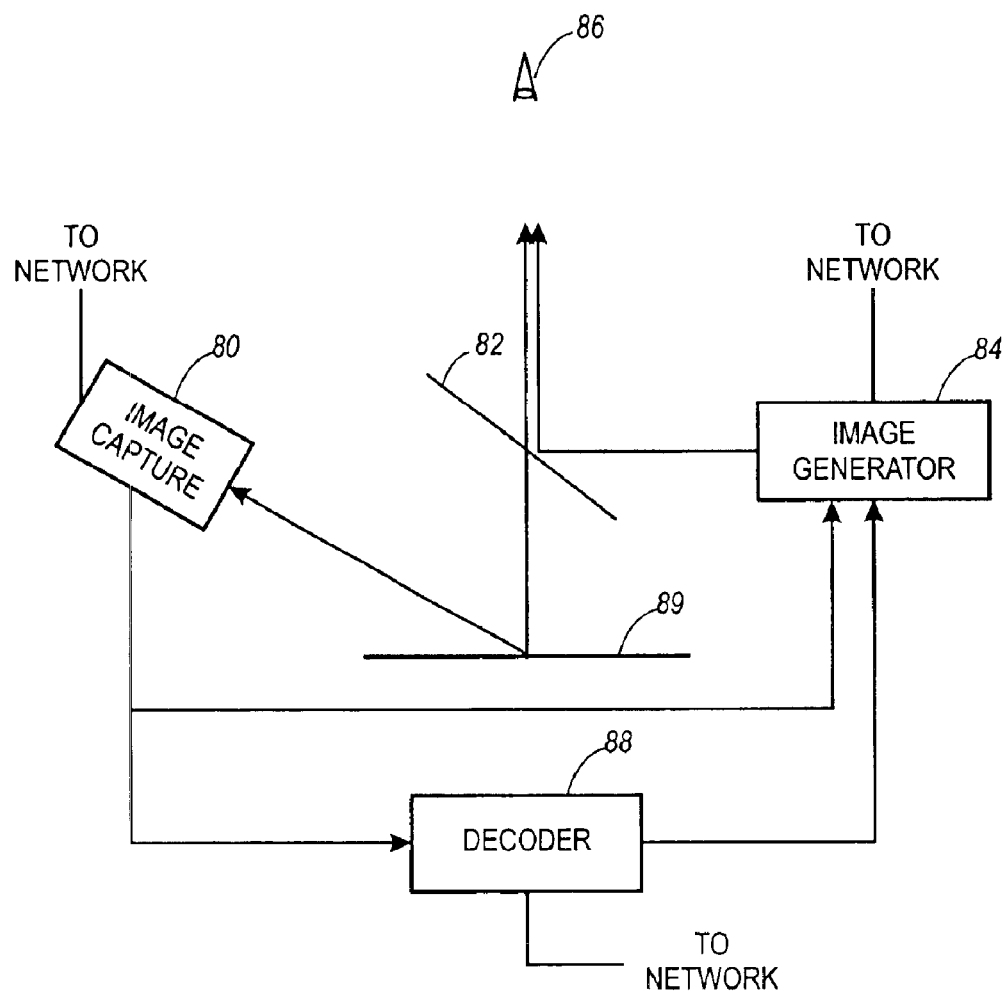
FIG. 8 illustrates another embodiment of a system consistent with the principles of the invention.

FIG. 8 is a block diagram illustrating an embodiment of a system consistent with the principles of the invention. A substrate 89 having embedded data thereon is positioned below a semitransparent mirror 82. An image from substrate 89 is captured by an image capture device 80. Image capture device 80 sends the captured image to a decoder 88, which decodes the image and determines codes from the captured image. Decoder 88 sends the codes to an image generator 84. Image generator 84 processes the codes, creates and/or retrieves image information based on the codes, and sends the image information to semitransparent mirror 82.

An observer 86 looking down onto semitransparent mirror 82 sees the image generated by image generator 84 overlaid on the image from substrate 89. In this way, the overlaid information can be dynamically updated and registered with information on substrate 89 based on the decoded image captured by image capture device 80.

In an alternative embodiment, image capture 80 receives the substrate image reflected from semitransparent mirror 82.

Figure 9:
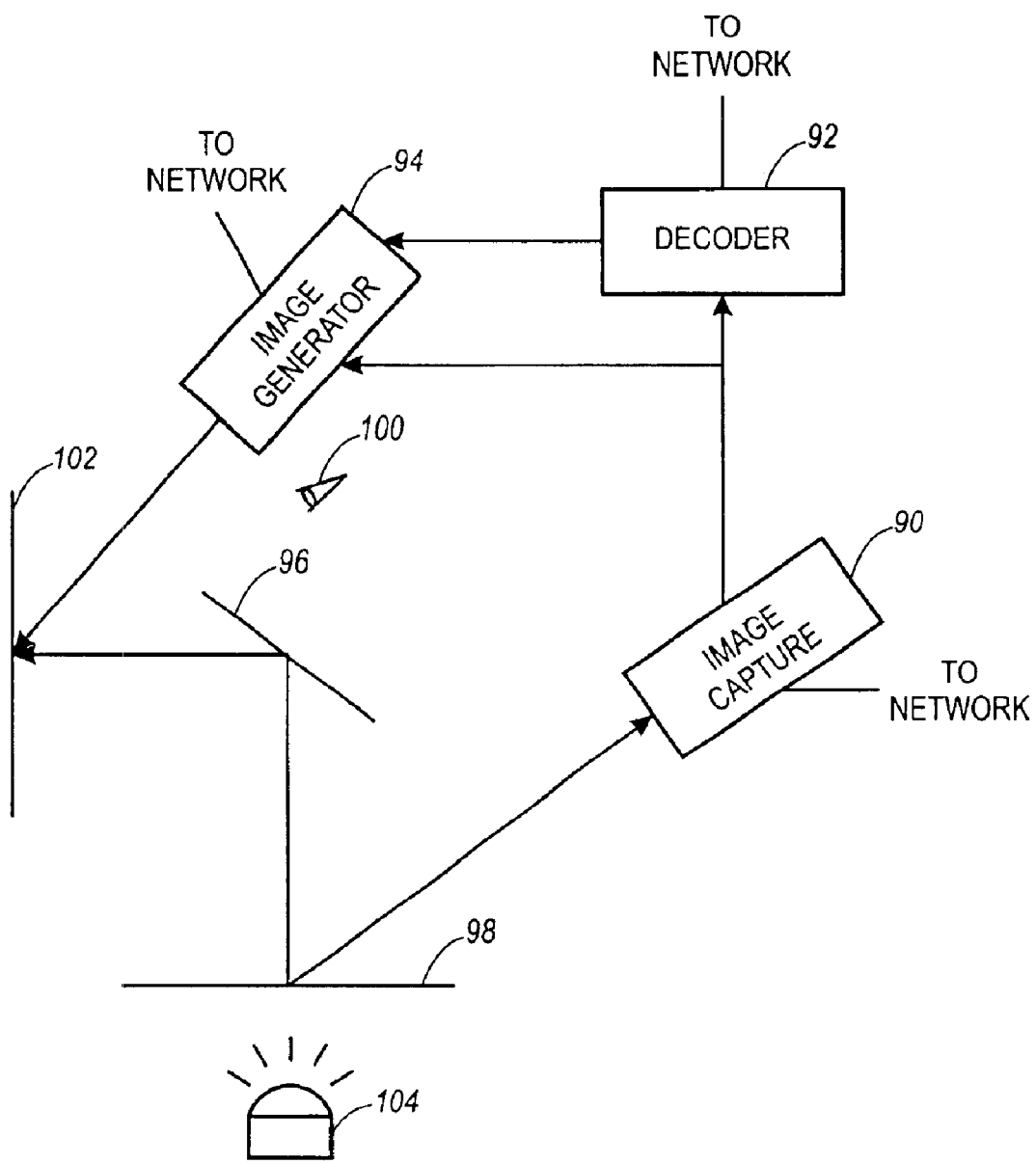
FIG. 9 is another embodiment of a system built in accordance with the principles of the present invention.

FIG. 9 is another embodiment of a system built in accordance with the principles of the present invention. An image from substrate 98 is reflected off semitransparent mirror 96 onto projection surface 102. The image from substrate 98 is also captured by an image capture device 90. Image capture device 90 transfers the image to a decoder 92, which processes the image to decode registration information and to determine whether further information should be generated. Based on the determination, decoder 92 passes signals to image generator 94, directing image generator 94 to generate an image. Image generator 94 generates an image, which is projected onto projection surface 102. Observer 100 viewing projection surface 102 sees the image from substrate 98 overlaid and registered with the image generated by image generator 94. The system may also include illumination source 104 for illuminating substrate 98.

In each of the systems of FIG. 6, FIG. 7, FIG. 8, and FIG. 9, the elements may send information to and receive information from network devices. This allows the elements to interact with devices on a network. For example, programs and data may be sent to the elements from network devices, and the devices may send information to the devices on networks.

Figure 10:
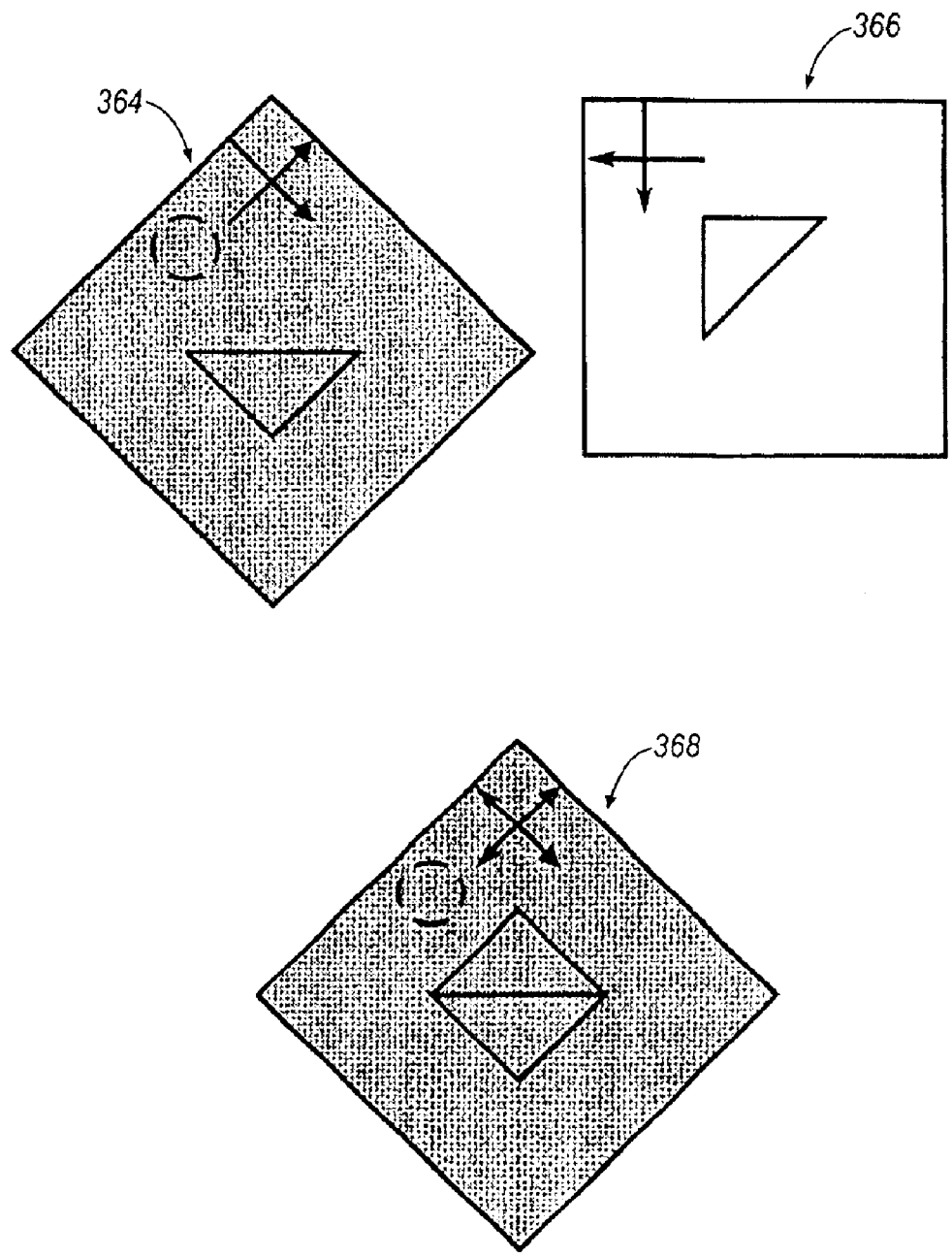
FIG. 10 is a diagram illustrating registration of information consistent with the principles of the invention.

FIG. 10 is a diagram illustrating registration of information consistent with the principles of the invention. The process may be carried out by the apparatus discussed above. Substrate 364 has embedded code embodied thereon, and may have images, such as a triangle. The embedded code embodies a code system from which x,y positions on substrate 364 can be determined.

An image capture device captures a portion of substrate 364, to thereby capture an image of a portion of the embedded code embodied thereon. The embedded code is decoded to determine an x,y location within the embedded code, and the orientation of substrate 364, represented by the crosshair arrow on substrate 364. A label code may also be decoded from the captured embedded code.

Based on the label code, image information 366 is retrieved from storage. The x,y location information and orientation information decoded from the embedded code embodied on substrate 364 are then used to register image information 366 with substrate 364. These may be used to form a composite image 368.

Figure 11:
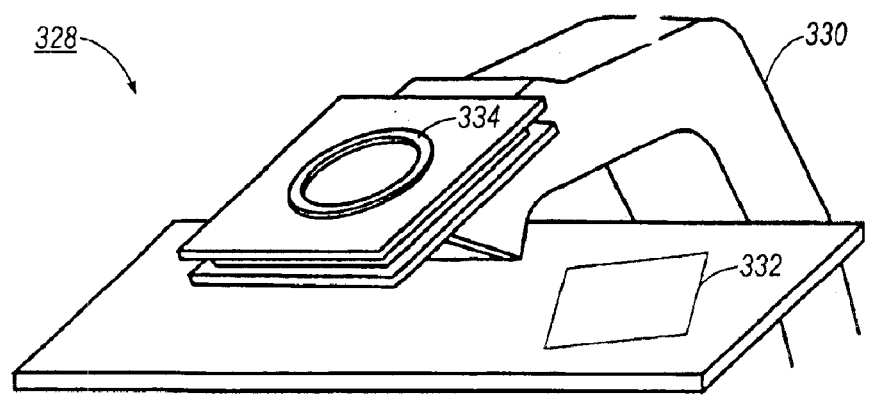
FIG. 11 is a block diagram illustrating one embodiment of a lens apparatus consistent with the principles of the invention.

FIG. 11 is a block diagram illustrating an embodiment of a lens apparatus consistent with the principles of the invention. Lens apparatus 328 is comprised of lens viewport 334, which is supported by support arm 330. A viewer looking down through lens viewport 334 observes substrate 332, which has embedded code embodied thereon. A camera (not shown) captures an image of substrate 332. The image is sent to a computer (not shown), which decodes the x,y location of substrate 332 appearing under lens viewport 334, the orientation of substrate 332 under lens viewport 334, and the label code, if any, in the embedded code on substrate 332. Based on the label, x,y location and orientation of substrate 332, the computer generates overlay image information which is displayed in lens viewport 334 in such a way that the generated image information is registered with substrate 332. The registered overlay image is projected by an image generator (not shown).

Figure 12:
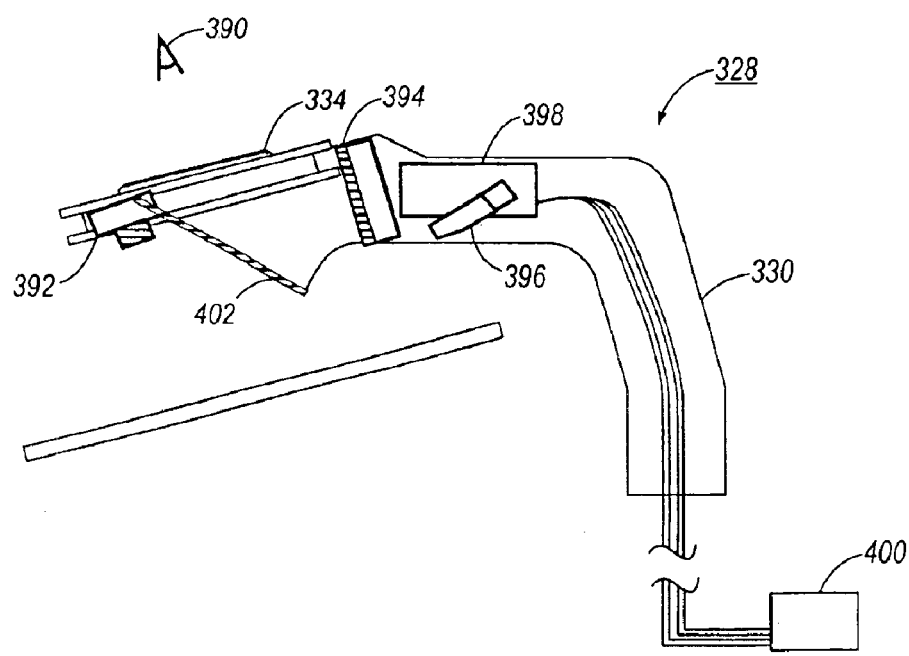
FIG. 12 is a cutaway side view of the lens apparatus shown in FIG. 11.

FIG. 12 is a cutaway side view of the lens apparatus shown in FIG. 11. Lens apparatus 328 further comprises camera 392, display 394, lamp 396, display controller 398, computer 400 and semitransparent mirror 402. Lamp 396 illuminates substrate 332 (not shown). Camera 392, which corresponds to image capture devices 70, 80, 90 illustrated in FIG. 7, FIG. 8, and FIG. 9, respectively, captures an image of the substrate, and transmits the image to computer 400. Computer 400 performs the function of decoders 72, 82, 92 illustrated in FIG. 7, FIG. 8, and FIG. 9, respectively. Computer 400, in combination with display controller 398 and display 394, performs a function most similar to image generator 84 illustrated in FIG. 8 because the generated image is reflected off semitransparent mirror 402.

Computer 400 decodes the embedded data in the captured image to determine the x,y location of the captured image, which represents the location of the area on substrate appearing under lens viewport 334.

Computer 400 also decodes the embedded data in the captured image to determine the orientation of substrate 332 under lens viewport 334, and the label code, if any, in the embedded code of the captured image. From this information, computer 400 generates the overlay image information, which is sent to display controller 398. Display controller 398 sends the overlay image information to display 394. Display 394 generates an overlay image based on the overlay image information from display controller 398. Observer 390 looking through viewport 334 sees substrate 332 through semitransparent mirror 402 overlaid with the overlay image information generated by image generator 394.

Figure 13:
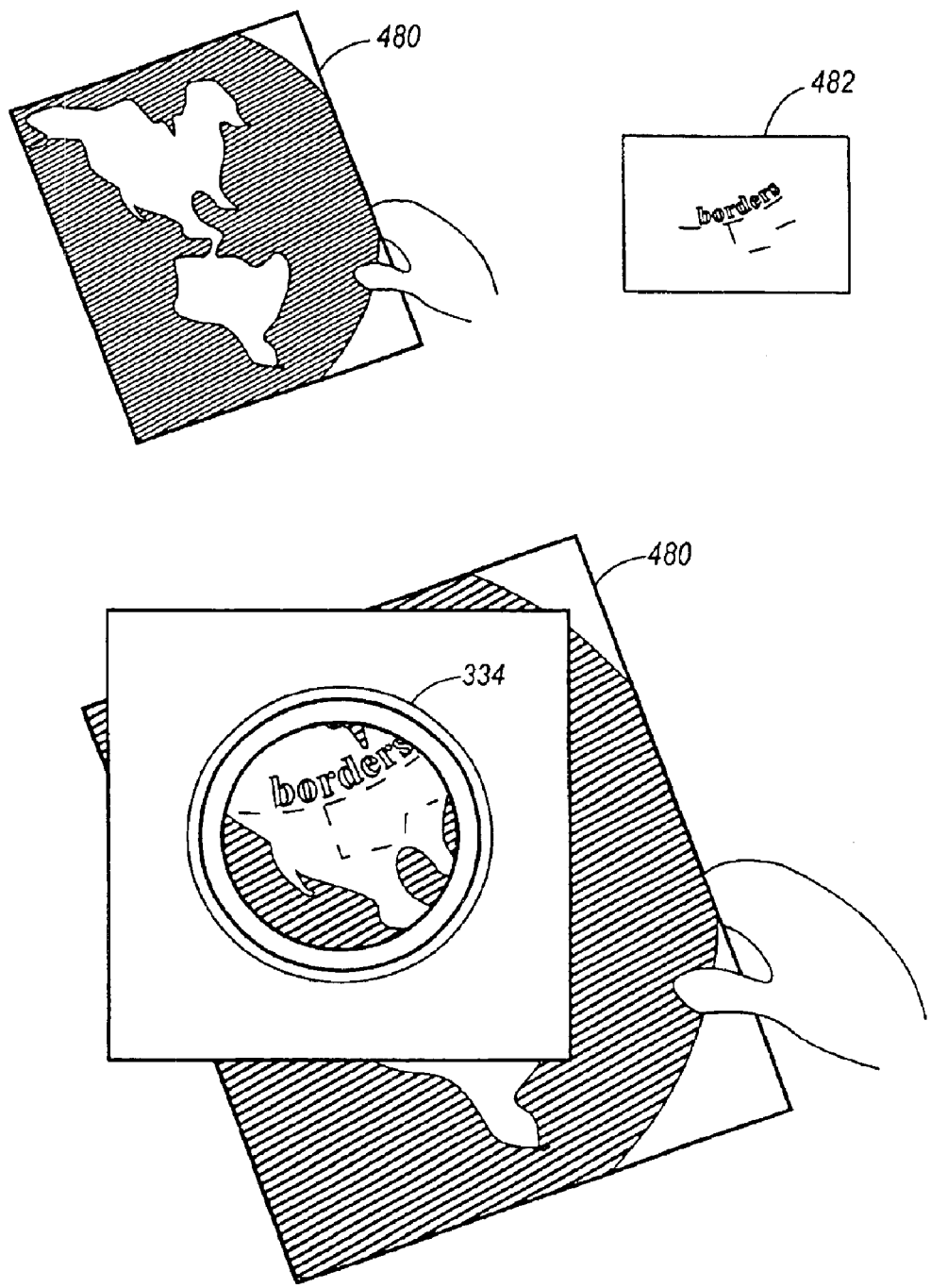
FIG. 13 illustrates an example of a substrate, an overlay image, and the substrate overlaid with the overlay image as seen through the lens viewport illustrated in FIG. 11 and FIG. 12.

FIG. 13 illustrates an example of a substrate, an overlay image, and the substrate overlaid with the overlay image as seen through the lens viewport illustrated in FIG. 11 and FIG. 12. The substrate 480 is comprised of images of North and South America and embedded data. In one embodiment, the substrate is covered entirely with embedded data. A user places substrate 480 under lens viewport 334 and camera 392 captures the image appearing under lens viewport 334 and transmits the image to computer 400. Computer 400 decodes the embedded data in the captured image from substrate 480 to determine the x,y location of the captured image, which represents the location of the area on substrate appearing under lens viewport 334. Computer 400 also decodes the embedded data in the captured image to determine the orientation of substrate 480 under lens viewport 334, and the label code, if any, in the embedded code of the captured image.

From this information, computer 400 generates overlay image information 482, which is sent to display controller 398. Display controller 398 sends overlay image information 482 to display 394. Display 394 generates overlay image information 482, which is reflected off semitransparent mirror 402 through lens viewport 334. Observer 390 (FIG. 12) looking through viewport 334 sees substrate 480 through semitransparent mirror 402 overlaid with overlay image information 482 generated by image generator 394. In FIG. 13, observer 390 sees borders overlaid on North America.

Figure 14:
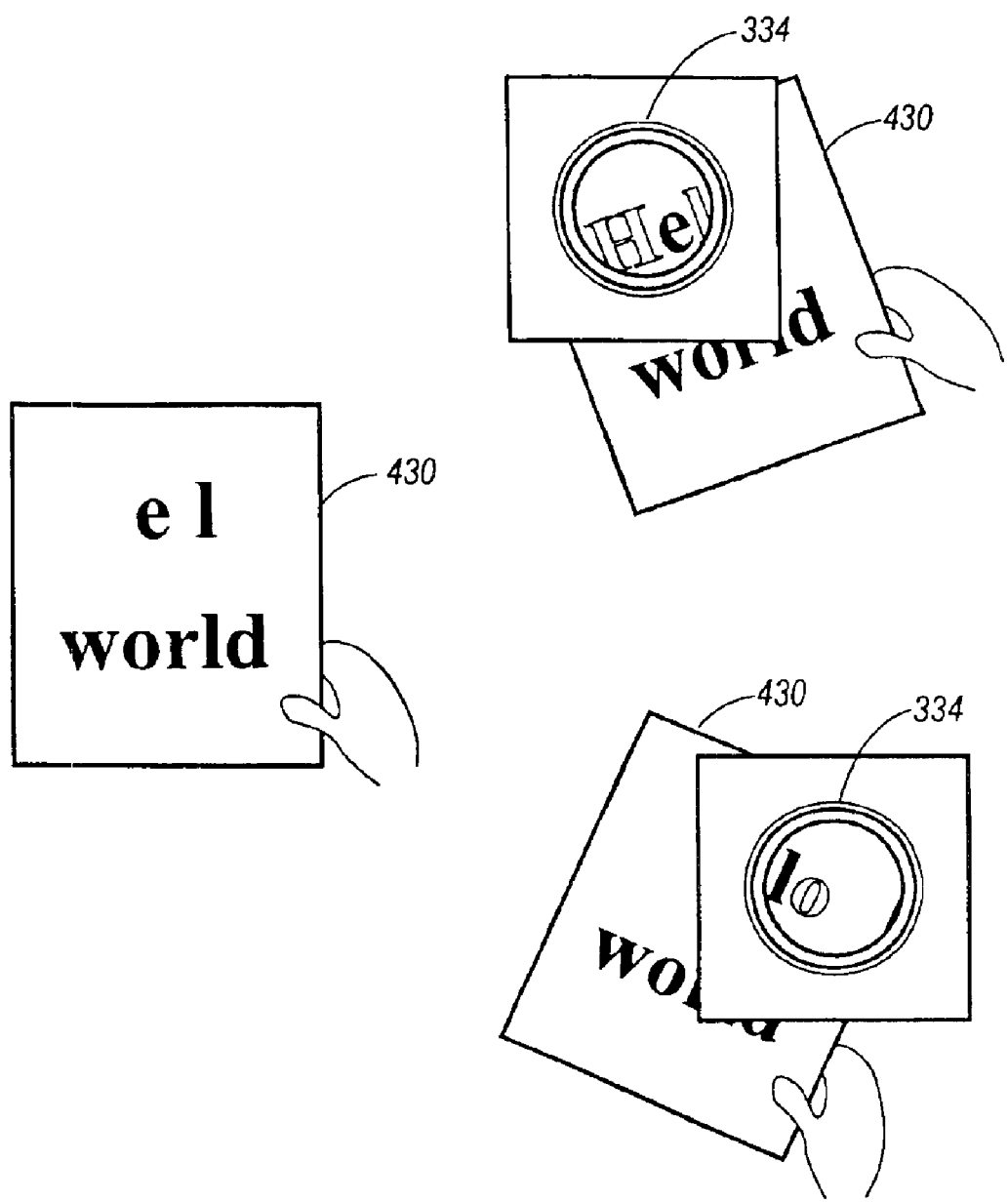
FIG. 14 illustrates another example of a substrate, an overlay image, and the substrate overlaid with the overlay image as seen through the lens viewport illustrated in FIG. 11 and FIG. 12.

FIG. 14 illustrates another example of a substrate, an overlay image, and the substrate overlaid with the overlay image as seen through the lens viewport illustrated in FIG. 11 and FIG. 12. More particularly, FIG. 14 illustrates how the system responds when the user moves substrate 430 under lens viewport 334. In this example, substrate 430 comprises the lowercase letters "e 1" and "world." Substrate 430 also includes embedded data embodied thereon (not shown). When the user moves substrate 430 so that letter "e" is under lens viewport 334, camera 400 captures an image of the substrate area under lens viewport 334. Computer 400 decodes the embedded data in the captured image from substrate 430 to determine the x,y location of the captured image, which represents the location of the area on substrate appearing under lens viewport 334. Computer 400 also decodes the embedded data in the captured image to determine the orientation of substrate 430 under lens viewport 334, and the label code, if any, in the embedded code of the captured image.

From this information, computer 400 generates overlay image information "H 1," which is sent to display controller 398 and reflected off semitransparent mirror 402. A user looking through lens viewport 334 sees the "e" overlaid with overlay image information "H 1," as illustrated in the upper right of 14. When the user moves substrate 430 so that "1" appears under lens viewport 334, camera 392 captures an image of the new area under lens viewport 334. Computer 400 decodes the embedded data in the new area, and generates an image of "o," which is sent to display controller 398. A user looking through lens viewport 334 sees the "1" overlaid with overlay image information "o," as illustrated in the lower right of 14. Thus, as the user moves substrate 430, the overlay image information is dynamically modified to appear in lens viewport 334. More particularly, the overlay image information is dynamically modified to maintain registration with the area of substrate 430 appearing under lens viewport 334.

Each of the systems described with respect to FIG. 7, FIG. 8, FIG. 9, and FIG. 12, register image information with a substrate. Registering requires decoding the embedded data on the substrate to determine the content of the information to be registered and the orientation of the information relative to the substrate. Therefore, the decoding and registration techniques described herein can be applied in any system consistent with the principles of the invention.

Registering the overlay image with the substrate requires a precise determination of the orientation of the substrate with respect to the image capture device. To determine the orientation angle of the substrate relative to the image capture device, computer 400 resolves the angle between 0° and 360°. This is done in two steps. First, the quadrant offset angle (between −45° and +45°) from the lattice axis to the nearest quadrant axis is determined. Second, the quadrant angle of 0°, 90°, 180° or 270° is determined. The sum of the quadrant offset angle and the quadrant angle is the orientation angle.

Figure 15:
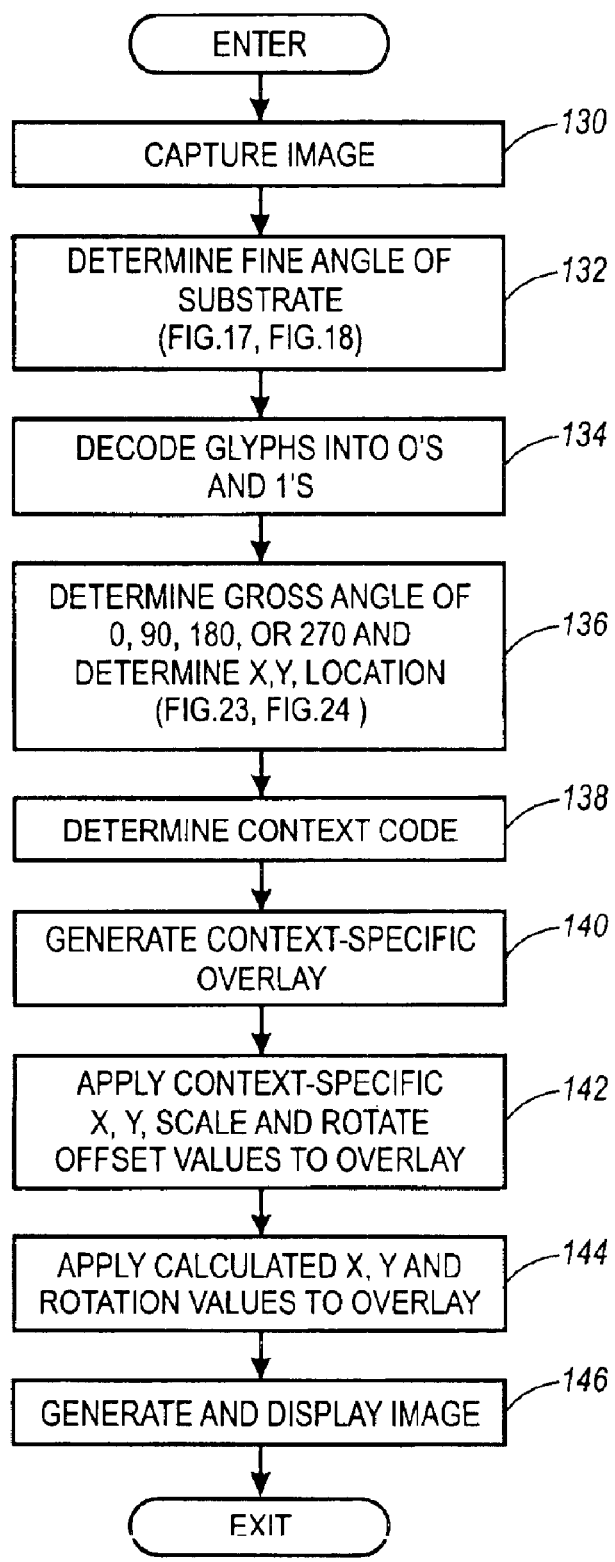
FIG. 15 is a flowchart showing the processing performed by computer 400 to register an image.

FIG. 15 is a flowchart showing the processing performed by computer 400 to register an image. Computer 400 first captures an image of the substrate, including a lattice of glyphs (step 130), and then determines the quadrant offset angle of the lattice of glyphs between −45° and +45° relative to the image capture device (step 132). Computer 400 then decodes the glyphs in the image into data composed of 0's and 1's (step 134). From the decoded data, computer 400 determines the quadrant angle of 0°, 90°, 180°, or 270°, and then correlates the data from step 133 with the address carpet code used to create the address carpet to determine the x,y location of the captured image (step 136). Computer 400 sums the quadrant offset angle and the quadrant angle to determine the orientation angle between the lattice code and the image capture device.

Computer 400 also determines a context code from the decoded data (step 138). Using the context code, computer 400 generates a context-specific overlay (step 140), and applies a context-specific x,y, scale and rotation offset values to the overlay (step 142). Finally, computer 400 applies the calculated x,y and rotation values to the overlay (step 144), and generates image information for display of the image (step 146).

In an another embodiment, the glyphs do not include a context label. In this embodiment, step 138 is not performed and retrieval of image information is based only on location code.

Figure 16:
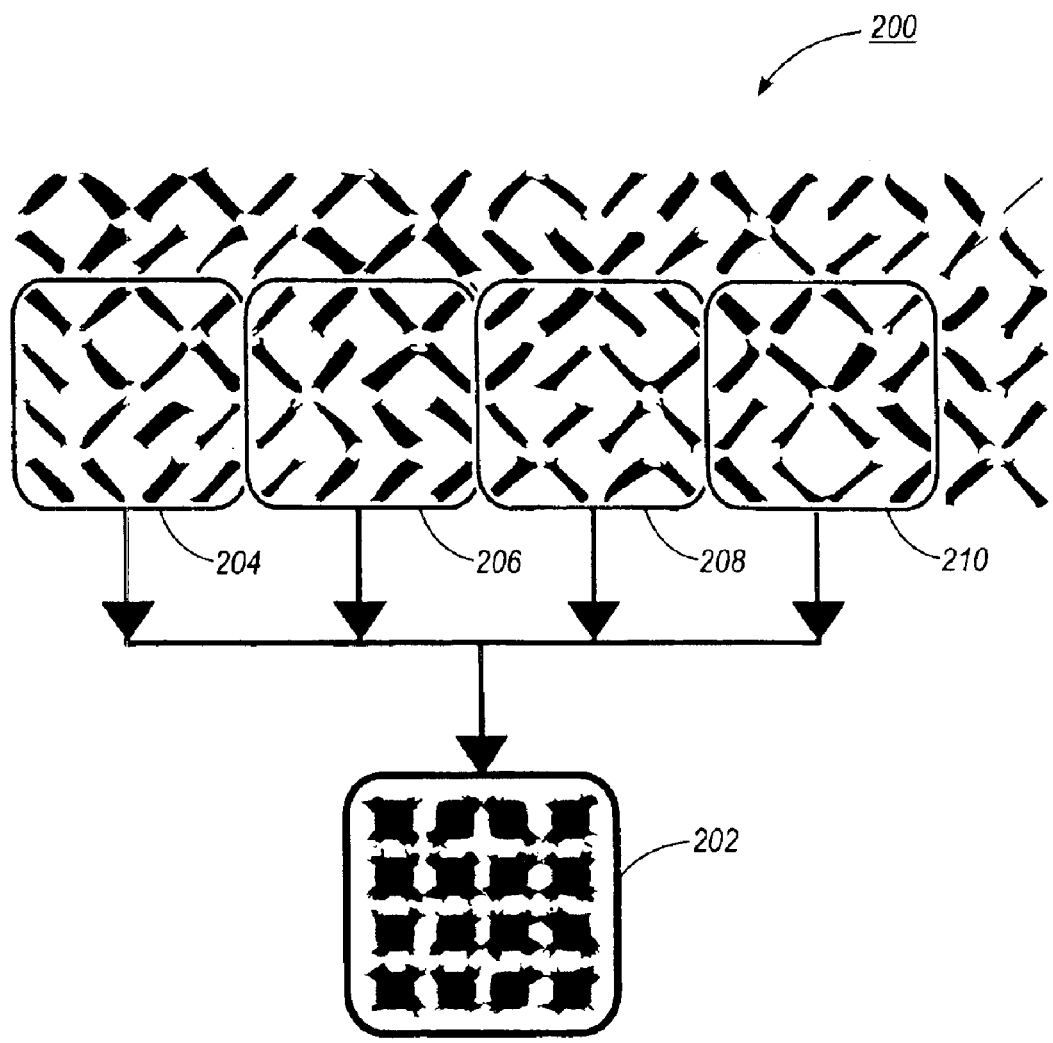
FIG. 16 graphically illustrates the process of creating an image of superimposed neighborhood images in a glyph lattice image, in accordance with the flowchart of FIG. 17.
Figure 17:
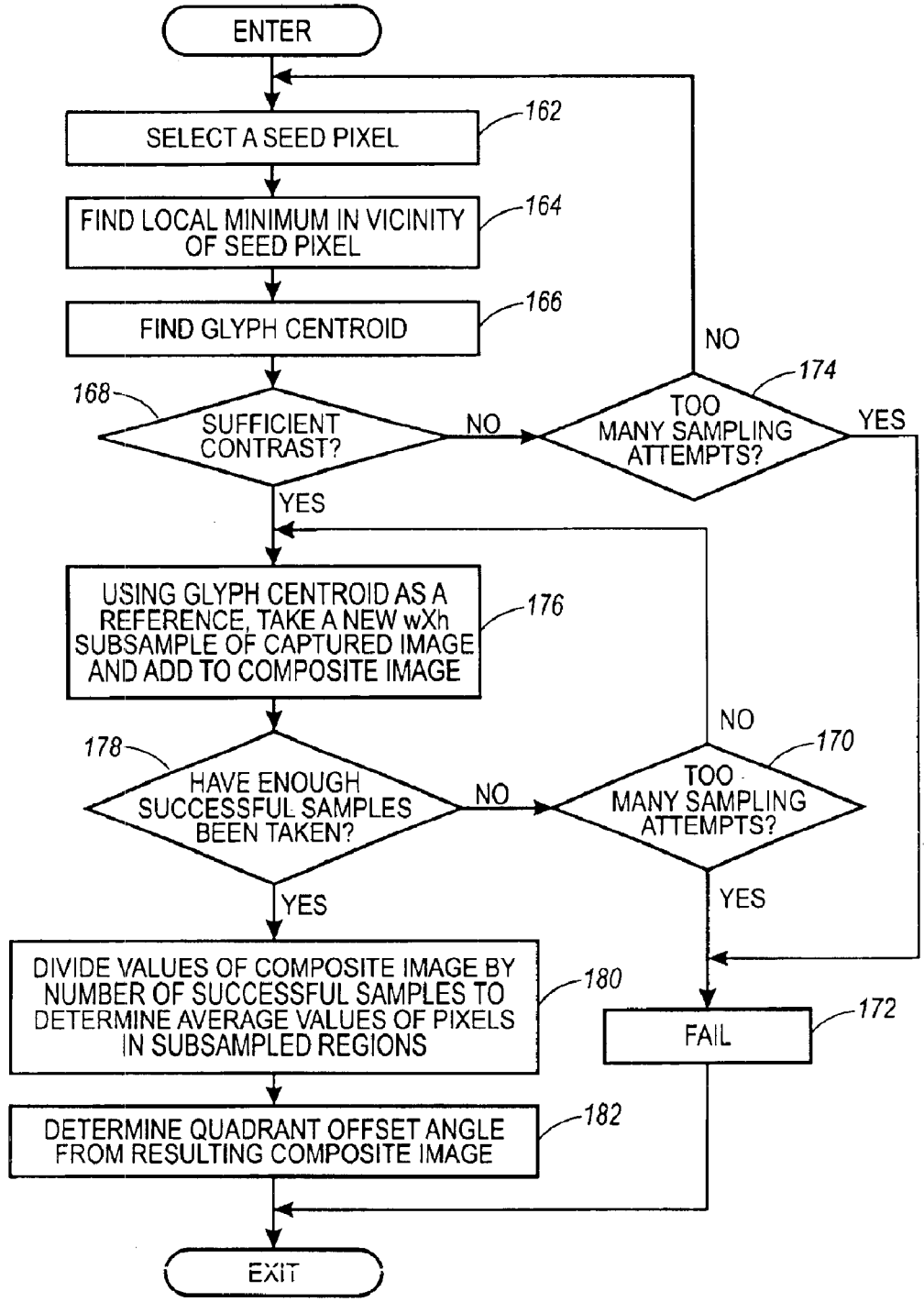
FIG. 17 is a flowchart showing the processing performed by a computer to determine a quadrant offset angle using a lattice image.

FIG. 16 illustrates graphically the process of creating an image of superimposed neighborhood images in a glyph lattice image, in accordance with the flowchart of FIG. 17. More particularly, in the embodiment shown in FIG. 16, representative neighborhood images 204, 206, 208, and 210 of glyph lattice image 200 are superimposed to form the composite image 202 of superimposed neighborhood images. From composite image 202, a quadrant angle can be determined, as discussed in detail below.

FIG. 17 is a flowchart showing the processing performed by computer 400 to create a composite lattice image for use in determining the quadrant offset angle. Computer 400 first selects a seed pixel from the image captured by camera 392 (step 162). In one embodiment, the selection of seed pixels begins at captured image coordinate 0,0. Computer 400 finds a local minimum in the vicinity of the seed pixel, indicating the presence of a glyph (step 164). Computer 400 then finds the centroid of this glyph (step 166), and determines whether the glyph has sufficient contrast with its immediate surround to be reliably decoded (step 168). Glyph centroids are discussed in greater detail with respect to FIG. 19. Computer 400 determines whether there have already been too many sampling attempts (step 174). If too many sampling attempts, the process fails (step 172). If not too many, processing continues at step 162 by selecting the next seed pixel for analysis at a particular x and y interval from the previously analyzed seed pixel (step 162). The particular x and y interval is based on the height and width of the composite image.

If there is sufficient contrast (step 168), computer 400, using the glyph centroid as the origin, adds a subsample of size w×h of the captured image to the composite image (step 176). Computer 400 then determines whether enough samples have been taken (step 178). If the limit is not exceeded, computer 400 determines whether there have been too many sampling attempts (step 170).

Figure 18:
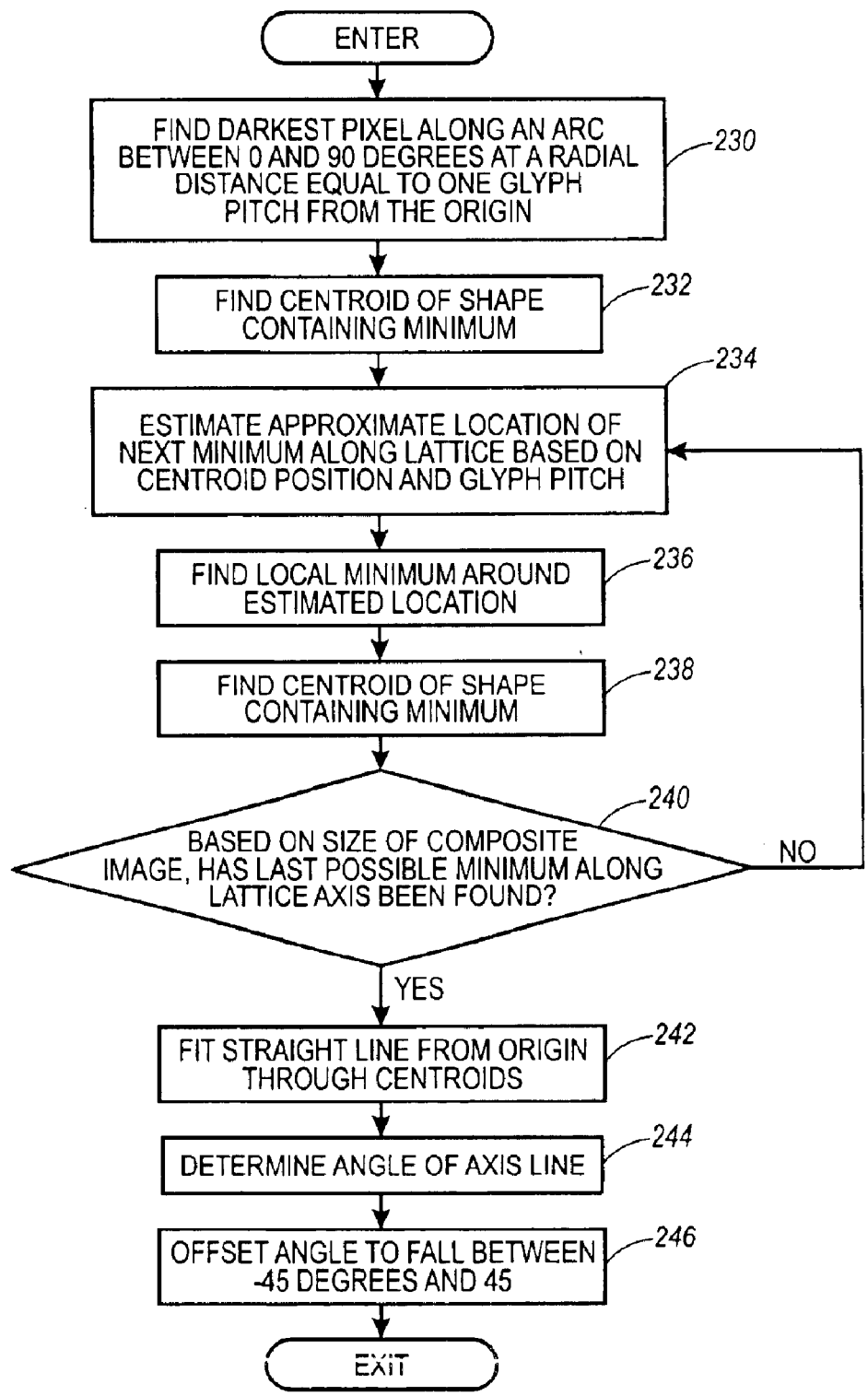
FIG. 18 is a flowchart showing the processing performed by a computer to create a composite lattice image for use in determining a quadrant offset angle using a composite lattice image.

If the sampling attempt limit has been exceeded, computer 400 divides the values of the composite image by the number of successful samples to determine an average of the values of pixels in the subsample regions (step 180). From the resulting composite image, computer 400 determines the quadrant offset angle (step 182), as illustrated in FIG. 18. The preciseness of the quadrant angle is proportional to the size of the composite image. Put another way, a large composite image will provide a more precise quadrant angle than a small composite image.

FIG. 18 is a flowchart showing the processing performed by computer 400 to determine a quadrant offset angle using a composite lattice image generated in accordance with the flowchart of FIG. 17. Computer 400 first finds the darkest pixel along an arc between zero and 90 degrees at a distance from the origin equal to the glyph pitch, the distance between adjacent glyphs on the lattice of glyphs (step 230), and then finds the centroid of the shape containing this pixel (step 232). Once the centroid is found, computer 400 assumes that the lattice axis passes through this centroid and the origin, so it then estimates the approximate location of the next minimum along the lattice axis based on the centroid position and the glyph pitch (step 234). Using this estimate, computer 400 finds the local minimum around the estimated location (step 236), and finds the centroid of the shape containing that minimum (step 238). Based on the size of composite image, computer 400 determines whether the last possible minimum along the lattice axis been found (step 240). If the last possible minimum has not been found, processing continues at step 234. If the last possible minimum has been found, computer 400 fits a straight line, referred to as the axis line, from the origin through the centroids (step 242). Computer 400 then determines the angle of the axis line, between 0° and 90° (step 244), and this angle is then offset to fall between −45 degrees and +45 degrees by subtracting 45° (step 246).

Figure 19:
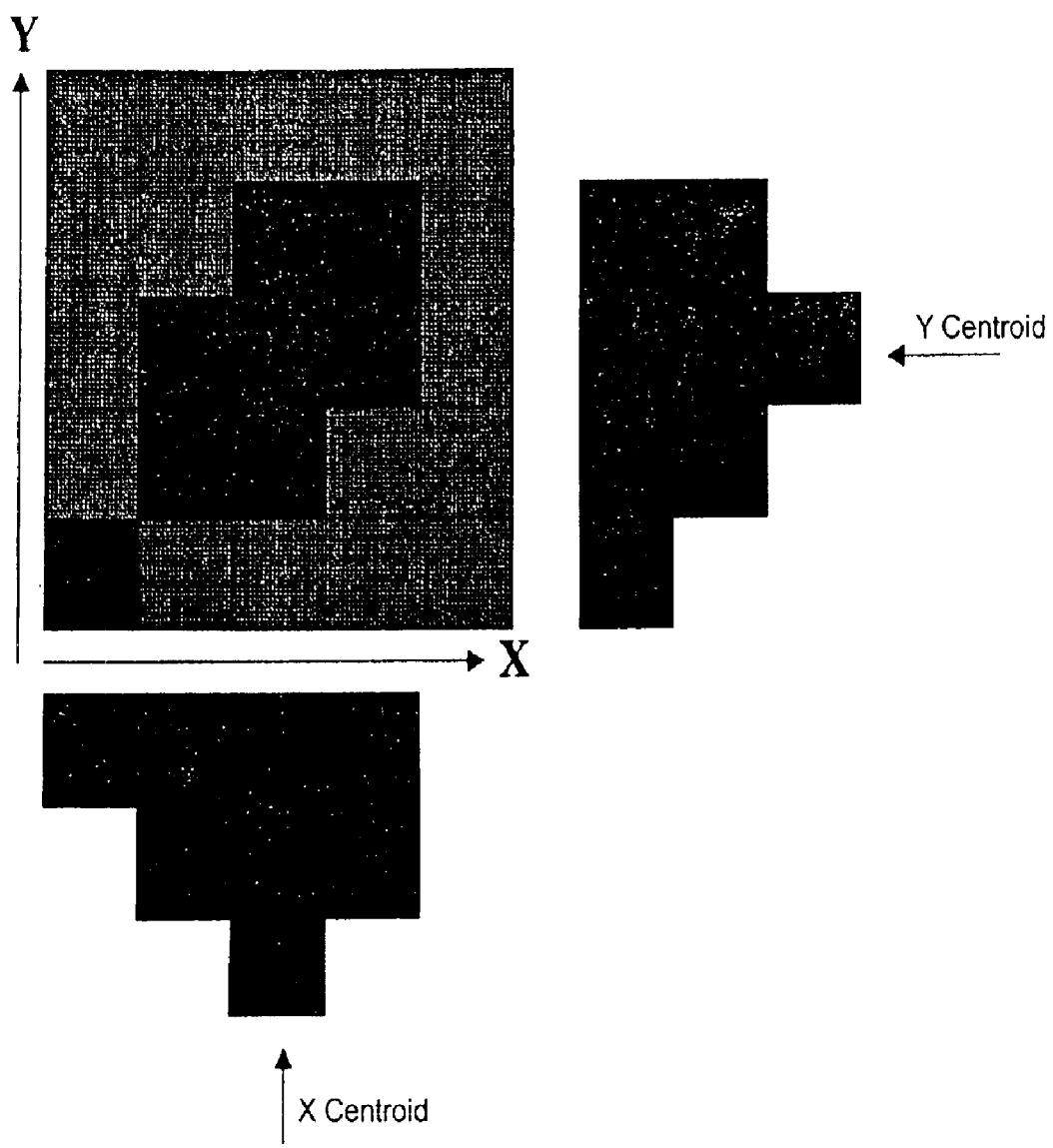
FIG. 19 illustrates finding a glyph centroid.

FIG. 19 illustrates graphically one way to find a glyph centroid consistent with the principles of the invention. The Y coordinate of the centroid is found by:

$$Y\_Centroid = \sum_{j=1}^{j=m}\left(Y_j * \sum_{i=1}^{i=n} F(X_i, Y_j)\right)\Big/ N$$

The X coordinate of the centroid is found by:

$$X\_Centroid = \sum_{i=1}^{i=n}\left(X_i * \sum_{j=1}^{j=m} F(X_i, Y_i)\right)\Big/ N \text{ where}$$

$$N = \sum_{j=1}^{j=m}\sum_{i=1}^{i=n} F(X_i, Y_j)$$

Centroids are used in the present invention in two ways: to align the subimages, and in the case of angle finding the centroid is used to more accurately establish the axis of the lattice, thus providing the angle.

Figure 20:
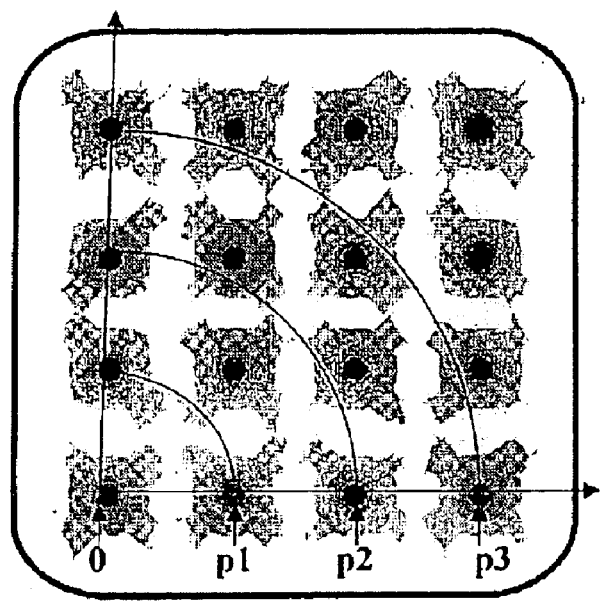
FIG. 20 and FIG. 21 illustrate analyzing the composite image, as illustrated in FIG. 16, to accurately determine the rotation angle of the composite image.
Figure 21:
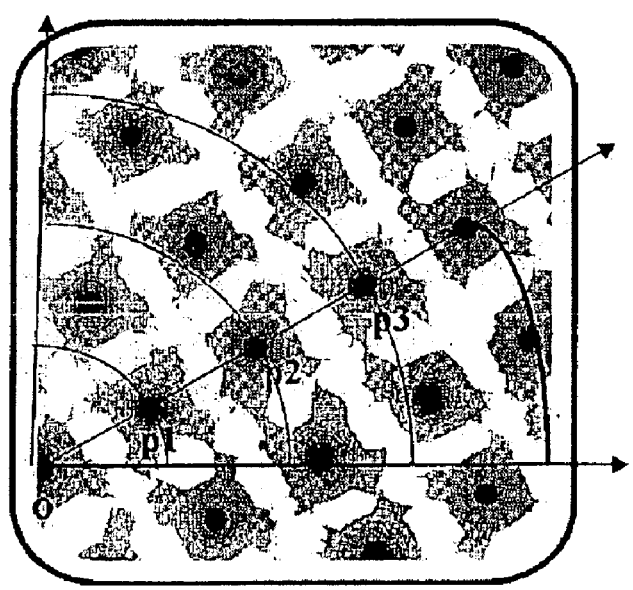

FIG. 20 and FIG. 21 illustrate the process of analyzing the composite image, as illustrated in FIG. 16, to accurately determine the rotation angle of the composite image. The quadrant offset angle of the composite image represents an accurate determination of the orientation of the glyph lattice in the original captured image, subject to determination of the proper angular quadrant. Combining the quadrant offset angle and the angular quadrant provides a complete determination of the relative angle of the image capture device and the substrate. FIG. 20 illustrates one example where the quadrant offset angle is 0°, and FIG. 21 illustrates another example where the quadrant offset angle is the finite angle theta.

Apparatus and methods consistent with the invention use address carpet codes and associated processes similar to those shown in U.S. patent application Ser. No. 09/144251, now issued as U.S. Pat. No. 6,327,395 B1. entitled GLYPH ADDRESS CARPET METHODS AND APPARATUS FOR PROVIDING LOCATION INFORMATION IN A MULTI-DIMENSIONAL ADDRESS SPACE, filed Aug. 31, 1998, which is hereby incorporated by reference.

Figure 22:
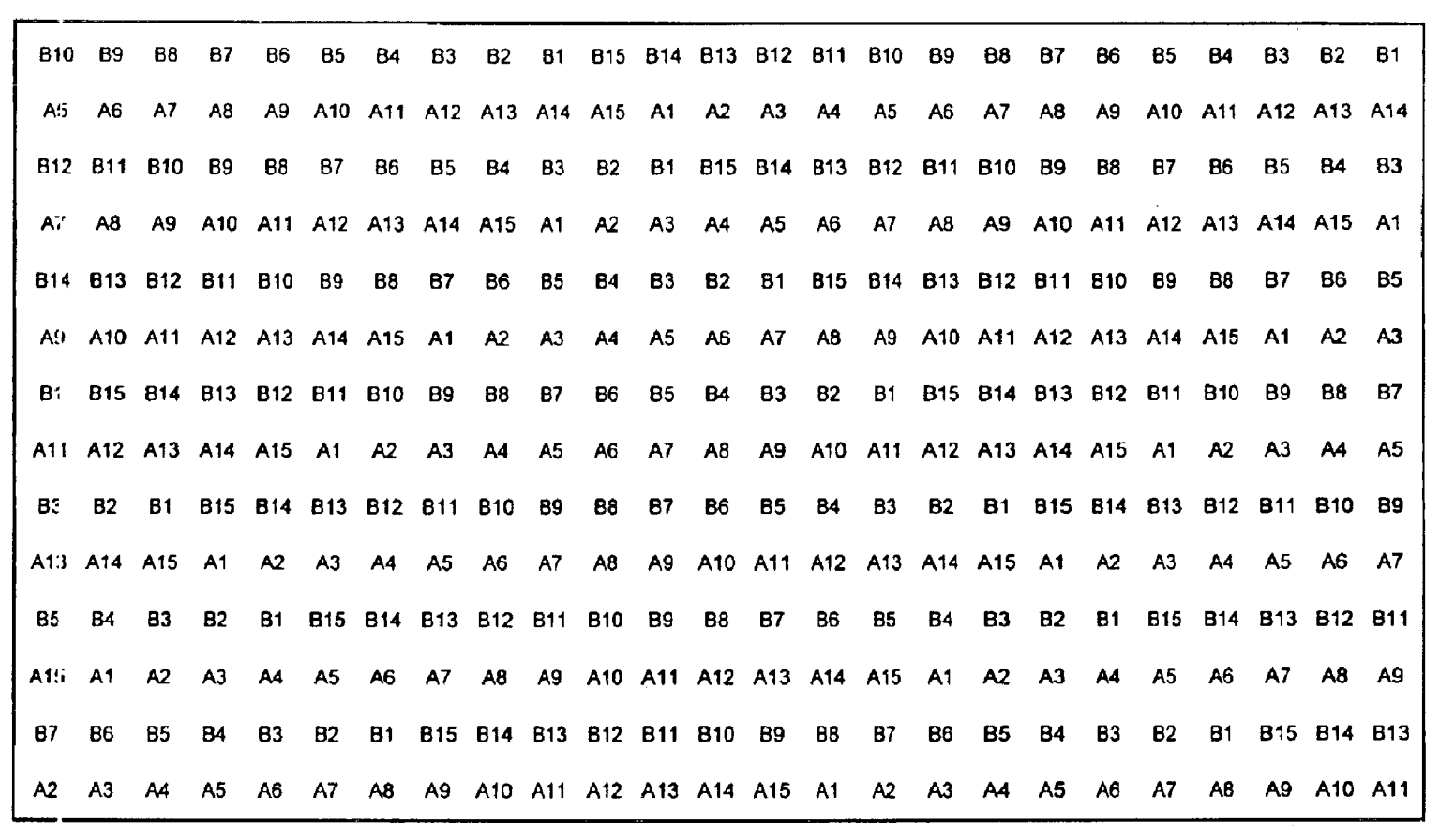

FIG. 22 illustrates an embodiment of the address codes encoded in a portion of a glyph address carpet similar to the u and v codes described above. The addresses are encoded by alternating rows of "A" address code sequences and "B" address code sequences. The position along each sequence in each row should be unambiguously determinable from a predetermined length subsequence. For example, an N-bit shift register maximal length code can be uniquely determined in position from an N-bit subsequence. Each address code sequence is a fifteen bit sequence, with the A sequence indexed running left to right, and the B sequence indexed running in a reverse direction, right to left. Each row of A code sequences is offset by two glyph positions relative to the previous and next row of A addresses. Similarly, each row of B code sequences is offset in the opposite direction by two positions. Thus, the encoding scheme has two key characteristics: parallel rows including two sets of one-dimensional unique address codes and relative offsets among members of the two sets so that the offset between each pair from the two sets is unique. This establishes two-dimensional unique address locations.

Computer 400 decodes address information encoded in the glyphs by analyzing the captured image area in two steps. Ideally, in the systems shown and described with respect to FIG. 7, FIG. 8, FIG. 9, and FIG. 12, image capture devices 70, 80, 90, and 392, respectively, capture an area of a substrate that is angularly aligned as shown in the pattern of bits shown in 22. In reality, however, the substrate and image capture device may not be aligned to one another. Thus, the relative angle between the two could be oriented anywhere from 0° to 360°. Therefore, computer 400 must first determine the orientation of the image as part of decoding and interpreting the address information.

The orientation of the image is determined by analyzing the captured image. This process is called disambiguation. One method of disambiguation is described in U.S. Pat. No. 5,521,372 to Hecht et al. expressly incorporated herein by reference. After determining the proper orientation of the image, computer 400 decodes the address of the selected location in the address carpet. Disambiguation and address decoding processes performed by computer 400 and consistent with the present invention will now be described in greater detail.

Figure 23:
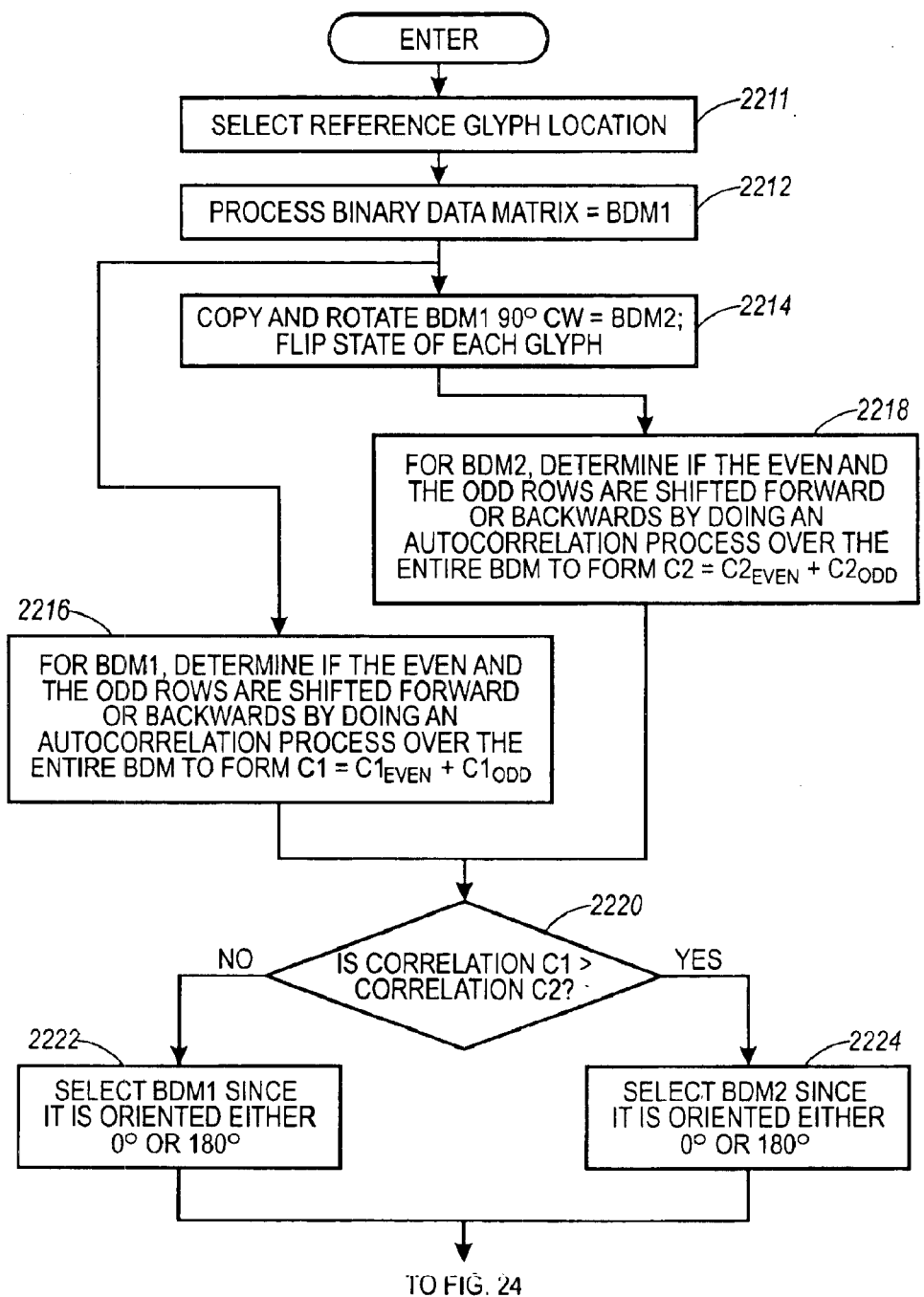
FIG. 23 and FIG. 24 form a flow chart showing the disambiguation and address decoding processes performed by a computer.
Figure 24:
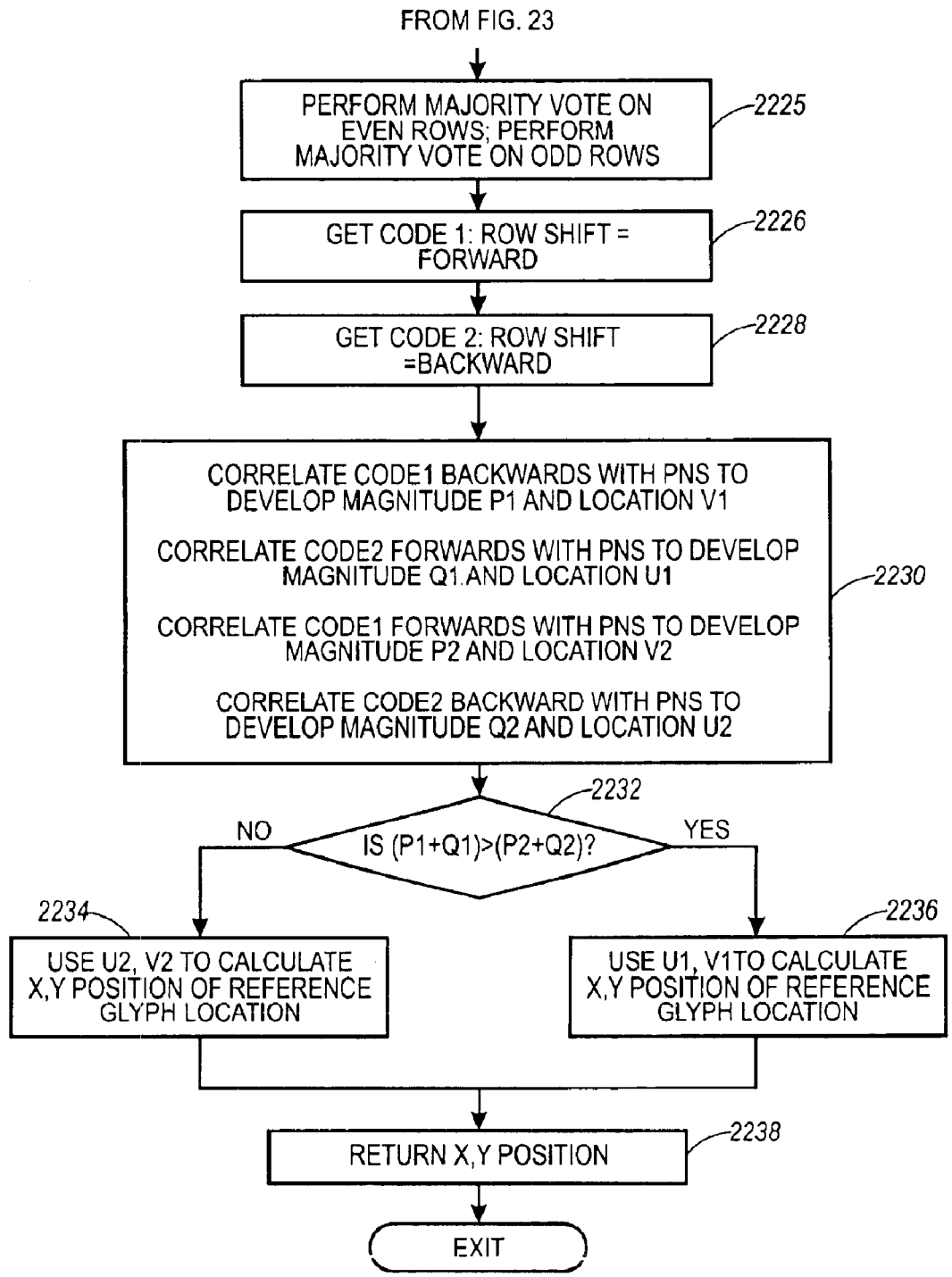

FIG. 23 and FIG. 24 form a flow chart showing exemplary disambiguation and address decoding processes performed by computer 400 on the captured image area. Computer 400 begins the disambiguation process by image processing the captured portion of the address carpet to find a glyph seed. A glyph seed is a first-identified glyph having readable glyphs around it. Once a glyph seed has been found, the glyph lattice can be determined by processing neighbors of the glyph seed. (See Appendices A and B). The glyphs are then decoded as 1's or 0's, which are filled into a binary data matrix having rows and columns corresponding to the glyph lattice rows. The orientation may still be ambiguous with respect to 90° and 180° rotations.

FIG. 25 illustrates a binary data matrix (BDM) 2310 formed from a glyph lattice captured by the image capture device. Locations in the BDM correspond to locations in the glyph lattice, and thus the size of the BDM corresponds closely to the size of the glyph lattice.

Each location of the glyph lattice is analyzed to determine which value should be placed in the corresponding location of the BDM. Initially, the BDM is filled with a value, for example $\phi$, which indicates that no attempt has been made to read the glyph. Once the glyph corresponding to a particular location has been analyzed, $\phi$ is replaced by a value indicating the result of the glyph analysis.

In FIG. 25, a B indicates a border location, an X indicates that no interpretable glyph was found at the corresponding location of the glyph lattice, an E indicates a glyph at the edge of the captured image portion, a 0 indicates a back slash glyph, a 1 indicates a forward slash glyph, and d indicates a label code. The area of the matrix corresponding to the captured image is filled with 0's and 1's, the edge is bounded by E's, and the X's correspond to locations that have no readable glyphs. Although the BDM will generally have a similar overall pattern to those of FIG. 25, the values will often not be as evenly distributed as shown in FIG. 25. For example, a glyph location within the captured image area might result in an X if the glyph has been obliterated. Several values have been drawn with circles and squares around them to illustrate the two separate code sequences that are staggered in opposite directions.

The image capture device might be oriented relative to the substrate at any angle. Therefore, the captured image could be oriented at any angle. Thus, even though a BDM of 0's and 1's is derived from the captured image, it is uncertain whether the BDM is oriented at 0° (i.e., correctly oriented), 90°, 180°, or 270° relative to the original code pattern in the glyph address carpet from which the image was captured. Until the orientation of the captured image is determined, it is not possible to derive the correct address code from the BDM. The orientation could be provided by auxiliary information such as physical system constraints. However, the orientation can be uniquely determined directly from the address codes.

After converting the glyphs to 0's and 1's, a reference glyph location is selected (step 2211). This location may be chosen in a variety of ways, but is typically a location which represents the selection. For example, the reference glyph location could be at the center of the BDM.

After the image has been converted to a BDM, it is processed by computer 400 (step 2212). The original BDM developed from the captured image is referred to as BDM1. Computer 400 makes a copy of BDM1 and rotates the copy clockwise 90° to form a second binary data matrix, BDM2 (step 2214). By rotating BDM1 by 90°, the rows of BDM1 become the columns of BDM2, and the columns of BDM1 become the rows of BDM2. Additionally, all bit values in BDM2 are flipped from 0 to 1, and 1 to 0, because a 45° slash glyph rotated 90° appears as opposite state of the non-rotated glyph.

Computer 400 then performs a correlation separately on the odd and even rows of BDM1 (step 2216) to determine whether code in the rows are staggered forward or backward. The correlation is also performed for the odd and even rows of BDM2 (step 2218). The correlation is performed over all the rows of each BDM, and results in correlation value C1 for BDM1 and correlation value C2 for BDM2.

Figure 26:
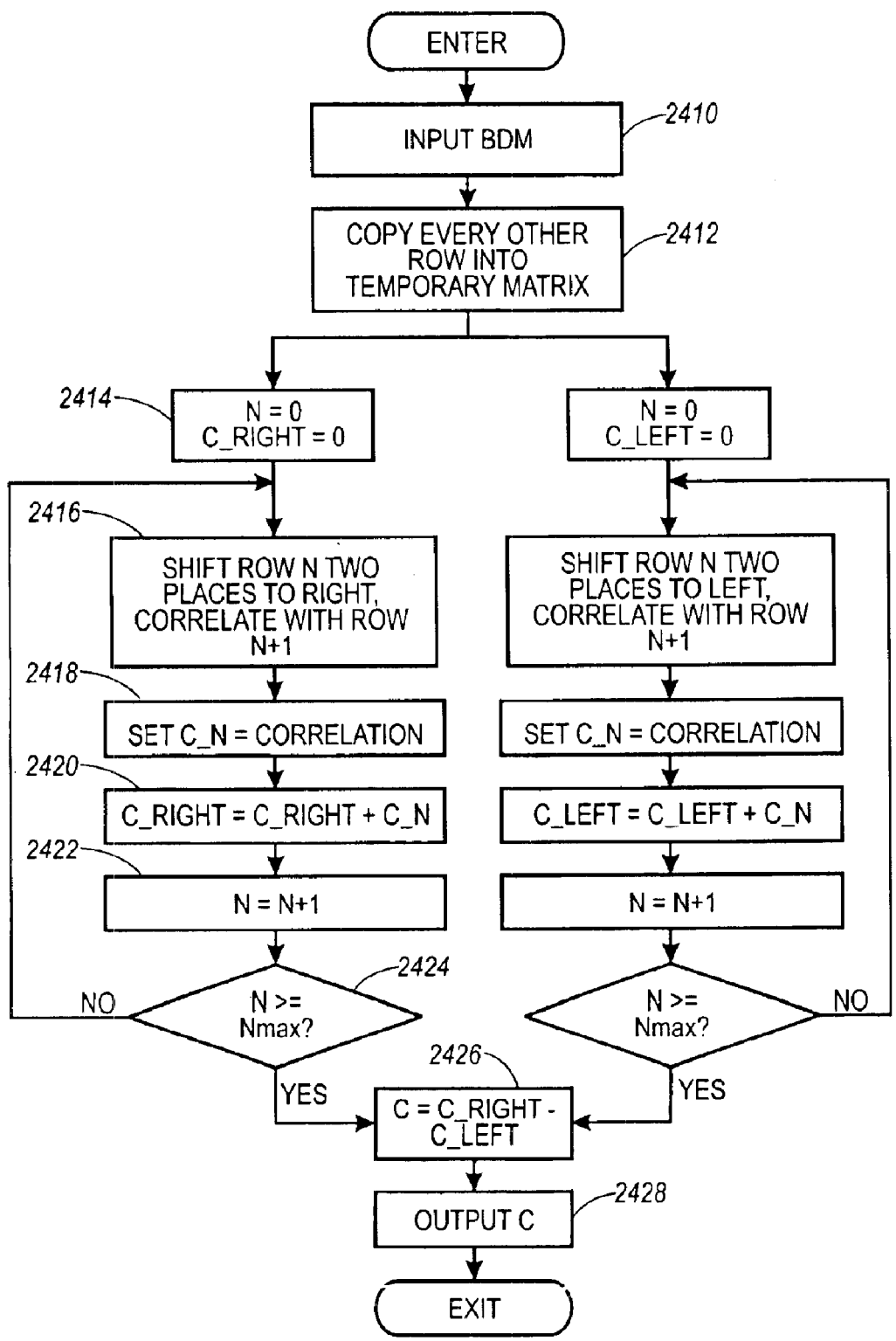
FIG. 26 is a flowchart showing an embodiment of correlation steps of FIG. 24.

FIG. 26 is a flowchart showing an embodiment of correlation steps 2216 and 2218 of FIG. 24. The process determines a correlation value for every other line of a BDM along diagonals in each direction, and sums the row correlation values to form a final correlation value for the odd or even rows. The process is performed on the odd rows of BDM1 to form correlation value $C1_{ODD}$ for BDM1, the even rows of BDM1 to form correlation value $C1_{EVEN}$ for BDM1, the odd rows of BDM2 to form correlation value $C2_{ODD}$ for BDM2, the even rows of BDM2 to form correlation value $C2_{EVEN}$ for BDM2. The BMD that is oriented at 0° or 180° will have a larger $C_{ODD}+C_{EVEN}$ than the other BDM.

Computer 400 first inputs the BDM (step 2410), and then copies every other row to a temporary matrix (step 2412). Identical processes are then performed for diagonals to the right and to the left. Steps 2414, 2416, 2418, 2420, 2422 and 2424 process the diagonals to the right. For example, in FIG. 27 the steps correlate along the diagonals moving from the upper left to lower right. First, row count N and correlation value C_RIGHT are each initialized to zero (step 2414). Row N is shifted two places to the right, and correlated with the next row (step 2416). C_N is then set to this value (step 2418). C_RIGHT is then set to C_RIGHT+C_N (step 2420), and N is incremented (step 2422). If row count N>=Nmax, where N is the number of odd or even rows in the BDM, then the process proceeds to step 2426. If N is not greater than or equal to Nmax, the process continues at step 2416. Thus, after the process has correlated each adjacent row, the correlation value C_RIGHT indicates the strength of the correlation along the diagonals to the right.

The steps on the right of FIG. 26 are similar to steps 2414, 2416, 2418, 2420, 2422 and 2424, but process diagonals running from the upper right to lower left to develop correlation value C_LEFT. After correlating the right and left diagonals to determine C_RIGHT and C_LEFT, a final correlation value C is determined by subtracting C_LEFT from C_RIGHT. For example, if odd rows for BDM1 are processed, the C value becomes $C1_{ODD}$ for BDM1.

The process steps of FIG. 26 are performed for the odd and even rows of BDM1 and the odd and even rows of BDM2. From this information, the correlation value C1 for BDM1 is set to $C1_{EVEN}+C1_{ODD}$ (as determined by FIG. 26 for the rows of BDM1), and the correlation value C2 for BDM2 is set to $C2_{EVEN}+C2_{ODD}$ (as determined by FIG. 26 for the rows of BDM1).

Figure 27:
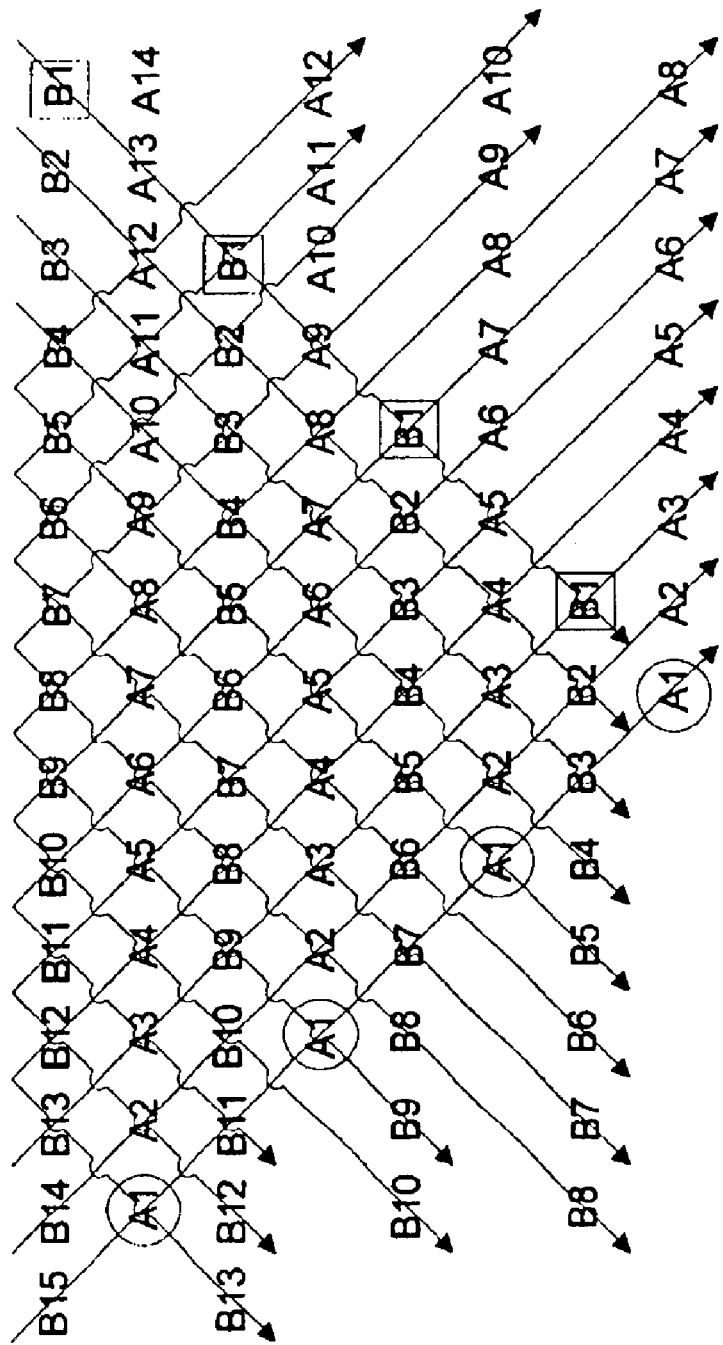
FIG. 27 illustrates why the correlations determine which way the codes in every other row are shifting.

FIG. 27 illustrates why the correlations determine which way the codes in every other row are shifting. For example, as indicated by the circled A1s along the diagonals running to the right, the codes along the diagonal starting at A1 in the first position of the second row should have the same value in every other row along the diagonal, except for erasures and errors. Similarly, as indicated by the boxed B1s, the codes along the diagonal starting at B1 in the upper right corner should have the same value in every other row along the diagonal, except for erasures or errors. This is true for each value along the diagonal in the odd rows running respectively from B2, B3, . . . B15 in the top row. Thus, the strong correlations along the diagonals running down and to the left on the odd rows, and the strong correlations along the diagonals running down and to the right on the even rows indicate that the codes in the even rows are shifting to the right, and the codes in the odd rows are shifting to the left.

For each BDM, therefore, four correlation values are developed: 1) odd rows, right to left, 2) odd rows, left to right, 3) even rows, right to left 4 and 4) even rows, left to right. From these correlation values, the strongest correlation value for the even rows, and strongest correlation value for the odd rows is chosen, and these become $C_{EVEN}$ and $C_{ODD}$ for that BDM (steps 2216 and 2218). $C_{EVEN}$ and $C_{ODD}$ are then added to form a final C correlation value for that BDM. As discussed above with respect to step 2220, the BDM with the strongest correlation value is the BDM that is oriented at either 0° or 180° because of the relative orientation of the codes in the odd and even rows. Thus, two aspects of the chosen BDM are now established: which direction every other line of codes is staggered, and that the BDM is oriented horizontally, at either 0° or 180°. Another correlation process, step 2230 is performed to determine which direction the code in each line runs (as opposed to which way the code is staggered).

The codes in the odd lines are staggered in one direction, and the codes in the even lines are staggered in the other. This staggering property of the code, in conjunction with knowing the respective codes that run in the odd lines and even lines, allows determination of the proper 0° orientation of the BDM.

Returning to FIG. 23, if C1 is greater than C2 (step 2220), then BDM1 is selected for further processing. C1 being greater than C2 indicates that the one-dimensional codes of BDM1 are most strongly correlated and are, therefore, oriented at either 0° or 180° (step 2222). If C2 is greater than C1, then BDM2 is selected for further processing, because the higher correlation indicates that BDM2 is oriented at either 0° or 180° (step 2224). Thus, the correct BDM has been found. Before determining the address location of the captured image, however, computer 400 must first determine whether the selected BDM is at 0° (i.e., oriented correctly), or rotated by 180°.

FIG. 24 is a flowchart showing the steps of how computer 400 determines the address of the captured area of the glyph carpet. Preferably, bit positions along a diagonal in the BDM, when the BDM is oriented at 0°, have the same value at every other row. The image capture process and interference from the visual indicia and substitution label codes d (as shown in FIG. 25), however, may result in errors and erasures in the BDM data. To reduce the impact of these errors and erasures, computer 400 performs a majority vote along each diagonal of the odd rows in the direction the odd rows are staggered, and repeats the majority vote process for even rows along the each diagonal in the direction the even rows are staggered (step 2225). This results in a first code sequence for the odd rows and a second code sequence for the even rows. To the extent the majority vote correctly determines each bit position, the first and second code sequences should match a subsequence of the original pseudo noise address sequence respectively corresponding to the odd or even set of rows.

Computer 400 then retrieves the original pseudo noise address code (Get Code 1) for rows staggered forward (step 2226), and retrieves the original pseudo noise address code for (Get Code 2) for rows staggered backward (step 2228). Using the original pseudo noise address code for each code set A and B, and the code from the majority voting, computer 400 performs four cross correlations (step 2230) to establishes the best match of the glyph sequence with the PN sequence location for the odd and even rows.

More particularly, two adjacent rows of the BDM closest to the reference element chosen in step 2211 are correlated with the respective complete PN sequences that created the original address carpet. The PN sequences could be identical. A forward and backward correlation is performed for each row. The four correlations develop four pairs of peak correlation and position values:

1) P1, V1, respectively representing the peak correlation value and corresponding position for Code 1 correlated backwards with the complete PN sequence;

2) Q1, U1, respectively representing the peak correlation value and corresponding position for Code 2 correlated forwards with the complete PN sequence;

3) P2, V2, respectively representing the peak correlation value and corresponding position for Code 1 correlated forwards with the complete PN sequence; and 4) Q2, U2, respectively representing the peak correlation value and corresponding position for Code 2 correlated backwards with the complete PN sequence.

The $U_i$ and $V_i$ position values, where i=1 or 2, corresponding to the peak magnitudes are used to determine the X and Y values corresponding to the reference element chosen in step 2211. Thus, if (P1+Q1)>(P2+Q2) (step 2232), then U1 and V1 are used to calculate the X, Y position of the reference glyph location chosen in step 2211 (step 2236). If (P1+Q1)<=(P2+Q2) (step 2232), then U2 and V2 are used to calculate the X, Y position of the reference glyph location chosen in step 2211 (step 2234). The address information is determined in accordance with the following equations:

$$X=(V_i-U_i+\text{length of full code})/2$$

$$Y=(V_i+U_i-\text{length of full code})/2$$

The calculated X, Y position is then returned (step 2238). Note that diagonals correspond to constant values of U and V, respectively, while rows and columns correspond to constant X and Y. Note also that U and V could be used directly as address parameters.

Thus, an X, Y value associated with the reference point chosen in step 2211 has been determined. Using this information, computer 400 associates the X, Y coordinates with a logical reference, or a combination of a logical reference and a control signal (e.g., a button click), with a particular operation to be performed. For example, the X, Y coordinates could be used as an index into a table of operations performable by computer 400 or other device under direction of computer 400. The X, Y coordinates could be associated with a file open command that opens a file associated with an icon located near the X, Y coordinates in the address space. Virtually any operation that can be performed by computer 400 could be associated with a particular X, Y coordinate, or range of X, Y coordinates.

Figure 28:
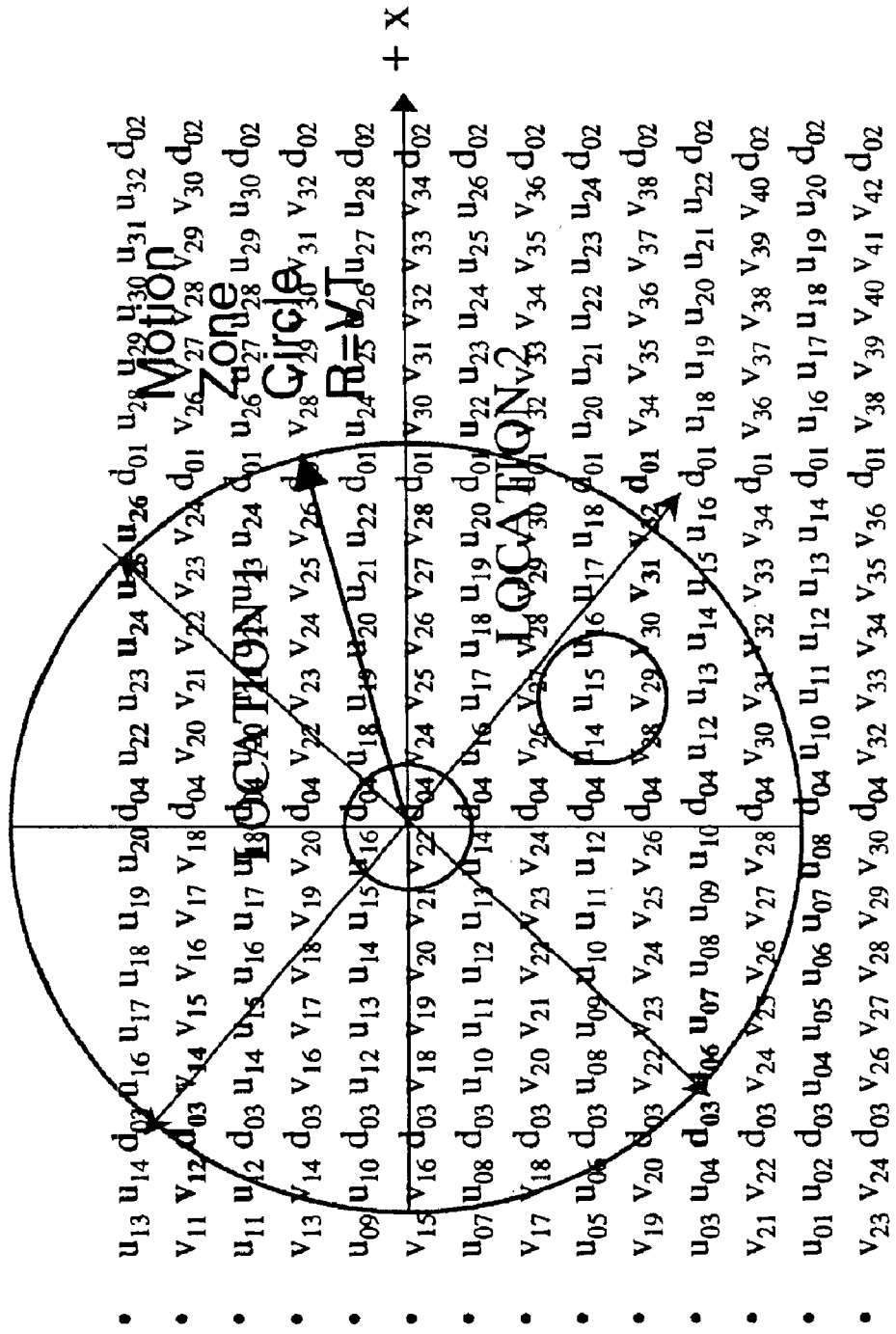
FIG. 28 shows a method for expedited processing when successive captures are processed from an image capture device.

FIG. 28 shows a method for expedited processing when successive image captures are processed from an image capture device when there is relative motion between the image capture device and the substrate at a velocity less than or equal to a predetermined value V. Initially, a first image is captured, and the entire address space is searched in accordance with the teachings above to determine the location coordinates of location #1. In the example shown in FIG. 28, location #1 has coordinates $u_{16}$, $v_{22}$. With motion velocity less than V, and time T between captures, the next capture is constrained to be within a circle of radius R=VT around the coordinates of location #1. Therefore, the index range used in searching for a correlation maximum indicating location #2 can be limited to the index range $u_i$, $v_j$ of locations within the circle of radius R around the coordinates of location #1. If a suitable correlation peak is not found, processing returns to searching the entire address space. Not finding a suitable correlation peak might indicate that motion has jumped outside the circle or the substrate has been changed.

The method expedites processing of information extraction and can enable applications such as real-time frame-to-frame image capture. This can be used for smoothed motion display and for gesture motion capture.

Figure 29:
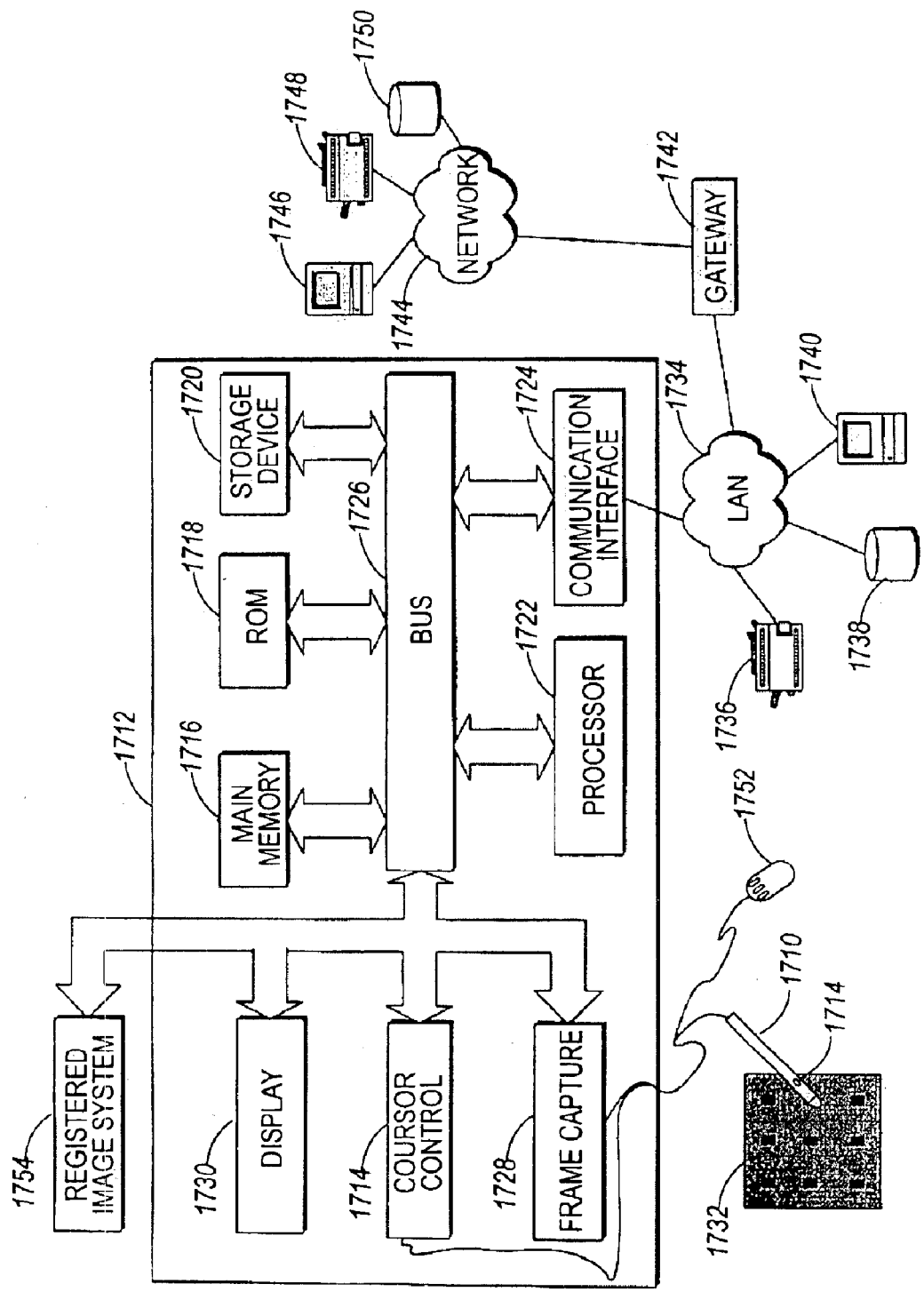
FIG. 29 is a block diagram of a user interface image capture system that may be used to capture a user-selected portion of a graphical user interface.

FIG. 29 is a block diagram of a user interface image capture system that may be used to capture a user-selected portion of a graphical user interface, such as glyph address carpet 1732, and decode the glyphs in the captured portion. In one embodiment, computer system 1712 is a general purpose computer system, such as a conventional personal computer or laptop computer, that includes main memory 1716, read only memory (ROM) 1718, storage device 1720, processor 1722, and communication interface 1724, all interconnected by bus 1726. Bus 1726 also connects to registered image system 1754, cursor control 1714, and frame capture 1728.

Registered image system 1754 may be comprised of a system embodying principles as shown and described with respect to FIG. 7, FIG. 8, FIG. 9, and FIG. 12, or other registered image system consistent with the principles of the invention. For example, registration system 328 of FIG. 12 may be implemented with the system of FIG. 29 by using computer system 1712 as computer 400 in FIG. 12. Frame capture 1728 receives a captured image from registered image system 1754 and provides the captured image to processor 1722. Processor 1722 decodes embedded data in the image to determine information, such as x,y location, label, and orientation information as described above, and sends image information based on the decoded information to registered image system 1754. Registered image system 1754 generates an image registered with the substrate based on the image information from processor 1722.

Registered image system 1754 may receive information from the other devices illustrated in FIG. 29, and may transmit information to the devices. This allows other devices, for example on a network, to interact with registered image system 1754.

Camera pen 1710 and mouse 1752 can provide control signals to processor 1722 in conjunction with the operation of registered image system 1754. Additionally, user interface substrate 1732 may be used as the substrate from which registered image system 1754 captures an image.

Camera pen 1710 is connected to frame capture 1728 and mouse 1752 and acts as an auxiliary pointing device. Camera pen 1710 transmits image information to frame capture 1728. In one embodiment, button 1714 of camera pen 1710 is wired to mouse 1752 so that when a user presses button 1714 a signal travels through the circuitry of mouse 1752 to cursor control 1714. The signal causes processor 1722 to run a program that directs frame capture 1728 to capture the image from camera pen 1710. In another embodiment, both the image line and signal line from camera pen 1710 are input directly into frame capture 1728. The lines between camera pen 1710 and computer 1712 can be wired in any way that provides capture of the image from camera pen 1710.

The user makes a selection by placing camera pen 1710 on or near visual indicia on glyph address carpet 1732, and pressing button 1714. Pressing button 1714 causes camera pen 1710 to capture the portion of the address carpet 1732 under the tip of camera pen 1710, and transmit the image to computer 1712, via frame capture 1728, for analysis. The button 1714, or multiple buttons, can be used for additional signaling, as in a double click, hold down.

Computer 1712 is also connected to local area network (LAN) 1734 for communicating with devices connected to LAN 1734. For example, LAN 1734 may be connected to a computer 1740, a printer 1736, and a mass storage 1738. LAN 1734 may be also connected to a gateway 1742 for connecting to another network 1744. Network 1744 may be connected to a computer 1746, a printer 1748, and a database 1750. By connecting computer 1712 to LAN 1734 and network 1744, computer 1712 can perform operations using the devices connected to these networks. For example, a document selected for printing by camera pen 1710 or mouse 1752 can be printed on printer 1736 or printer 1748. Similarly, a user may use computer 1712 to request a file on database 1750.

In one embodiment, main memory 1716 is a random access memory (RAM) or a dynamic storage device that stores instructions executed by processor 1722. Main memory 1716 may also store information used in executing instructions. ROM 1718 is used for storing static information and instructions used by processor 1722. Storage device 1720, such as a magnetic or optical disk, also stores instructions and data used in the operation of computer system 1712.

Display 1730 may be a CRT or other type of display device. Cursor control 1714 controls cursor movement on display 1730. Cursor control 1714 may be, for example, a mouse, a trackball or cursor direction keys.

The system shown in FIG. 29 can be used to implement the glyph address carpet capture and translation system described herein. The apparatus and methods described herein may be implemented by computer system 1712 using hardware, software, or a combination of hardware and software. For example, the apparatus and methods described herein may be implemented as a program in any one or more of main memory 1716, ROM 1718, or storage device 1720. In one embodiment, processor 1722 executes programs which analyze captured portions of a glyph address carpet to determine address information encoded in the glyphs.

Such programs may be read into main memory 1716 from another computer-readable medium, such as storage device 1720. Execution of sequences of instructions contained in main memory 1716 causes processor 1722 to perform the process steps consistent with the present invention described herein. Execution of sequences of instructions contained in main memory 1716 also causes processor to implement apparatus elements that perform the process steps. Hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1722 for execution. Such a medium may take many forms, including but not limited to, non-volatile memory media, volatile memory media, and transmission media. Non-volatile memory media includes, for example, optical or magnetic disks, such as storage device 1720. Volatile memory media includes RAM, such as main memory 1716. Transmission media includes coaxial cables, copper wire and fiber optics, including the wires that comprise bus 1726. Transmission media can also take the form of acoustic or light waves, such as those generated during radiowave and infrared data communications.

Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 1722 for execution. For example, the instructions may initially be carried on a magnetic disk or a remote computer. The remote computer can load the instructions into its dynamic memory and send the instructions over a telephone line using a modem. A modem local to computer system 1712 can receive the data on the telephone line and use an infrared transmitter to convert the data to an infrared signal. An infrared detector coupled to appropriate circuitry can receive the data carried in the infrared signal and place the data on bus 1726. Bus 1726 carries the data to main memory 1716, from which processor 1722 retrieves and executes the instructions. The instructions received by main memory 1716 may optionally be stored on storage device 1720 either before or after execution by processor 1722.

Computer system 1712 also includes a communication interface 1724 coupled to bus 1726. Communication interface 1724 provides two way communications to other systems. For example, communication interface 1724 may be an integrated services digital network (ISDN) card or a modem to provide a data communication connection to a corresponding type of telephone line. Communication may also be, for example, a local area network (LAN) card to provide communication to a LAN. Communication interface 1724 may also be a wireless card for implementing wireless communication between computer system 1712 and wireless systems. In any such implementation, communication interface 1724 sends and receives electrical, electromagnetic or optical signals that carry data streams representing various types of information.

The link between communication interface 1724 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the "Internet." Local networks and the Internet both use electrical, electromagnetic or optical signals that carry digital data streams. The signals through the various networks and the signals between the networks and communication interface 1724, which carry the digital data to and from computer system 1712, are exemplary forms of carrier waves transporting the information.

Computer system 1712 can send messages and receive data, including program code, through the network(s) via the link between communication interface 1724 and the external systems and devices. In the Internet, for example, a server might transmit a requested code for an application program through the Internet, an ISP, a local network, and communication interface 1724.

Program code received over the network may be executed by processor 1722 as it is received, and/or stored in memory, such as in storage device 1720, for later execution. In this manner, computer system 1712 may obtain application code in the form of a carrier wave.

Figure 30:
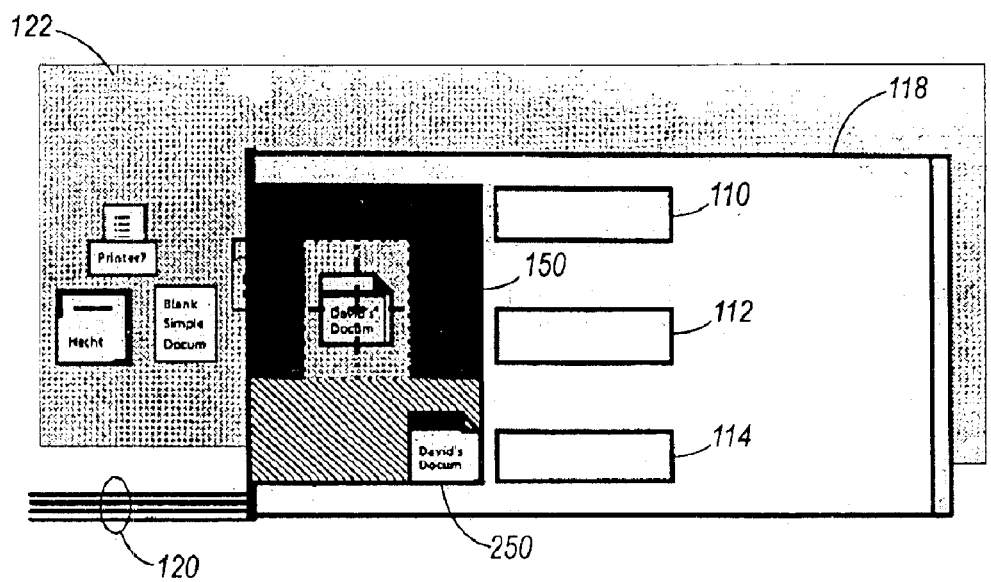
FIG. 30 is a block diagram illustrating another embodiment of an image registration system consistent with the principles of the invention.

FIG. 30 illustrates another embodiment of an image registration system consistent with the principles of the invention. Camera mouse 118 is comprised of camera mouse buttons 110, 112, 114, and a signal cable 120. A micro camera (not shown) in camera mouse 118 captures the area of substrate 122 defined by the target area indicators in response to the observer activating one or more of camera mouse buttons 110, 112, 114. The image captured by the micro camera can be processed locally in mouse 118 by a processing element (not shown) or sent over signal cable 120 for processing by a processing element in a device attached to camera mouse 118.

Because substrate 122 has embedded data embodied thereon, the embedded data captured in the image can be decoded. Thus, camera mouse 118 allows a user to place camera mouse 118 over a particular area of substrate 122 and capture an image of the area of substrate 122, which is then displayed in display 150. The embedded code in the captured image is decoded by a processing element to develop decoded information. The decoded information may represent anything about the substrate, such as context, location, and/or orientation. The processing element analyzes the decoded information and may perform an operation based on the decoded information and button controls, or queue the codes and button controls in a syntax queue to await further codes and button controls.

Based on the decoded information, image information is generated and displayed as an image on display 150. Several types of image information may be displayed. For example, the information may comprise the actual image captured by micro camera 134, a representation of the captured image, the actual image captured in addition to other information related to the captured image, or simply information related to the captured image without the captured image. In one embodiment, a representation of the substrate is retrieved and combined with the captured image to form a composite image on display 150 that shows the captured image and the extended area surrounding the captured image.

Display 150 shows David's Docum icon, which is the captured image, with superimposed cross hairs. Display 150 also shows an image 250 of David's Docum, indicating that that icon has been selected by the user. For example, if the user places the mouse over David's Docum, the mouse captures the image of David's Docum from substrate 122, and displays the captured image on display 150. If the user then activates a mouse button to select the icon, a representation of the David's Docum icon is displayed in display 150 as David's Docum icon 250.

Figure 31:
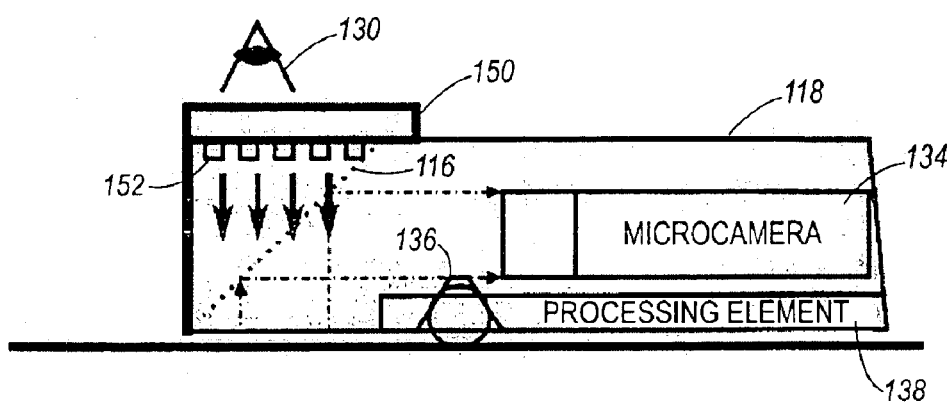
FIG. 31 is a block diagram showing a cutaway side view of the camera mouse.

FIG. 31 is a block diagram showing a cutaway side view of camera mouse 118. Camera mouse 118 includes a micro camera 134, an XY motion sensor 136, illuminators 152, and processing element 138. Processing element 138 processes signals from XY motion sensor 136 and images from micro camera 134. In alternative embodiments, XY sensor 136 may be removed.

Micro camera 134 receives an image of substrate 122 reflected off semitransparent mirror 116. An observer 130 viewing an image on display 150 may capture the image by pressing one or more of camera mouse buttons 110, 112, or 114. The area of substrate 122 captured by micro camera 134 is then processed by processing element 138. Although FIG. 31 illustrates processing element 138 located in mouse 118, all or part of the processing may be performed externally by processing elements connected to camera mouse 118 by signal cable 120.

Conclusion

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. An apparatus for displaying registered information using embedded data, comprising:

an image capture device for capturing a first image of a substrate having first visible data and embedded data embodied thereon;

a decoder for decoding the embedded data to develop registration information;

a device for retrieving second information from a storage location identified by the registration information; and a display for displaying a second image including second visible data representing the second information; the second image being positioned relative to the first image based on the registration information such that an observer, by using the display, sees the first visible data of the first image and the second visible data of the second image spatially related to the first visible data of the first image wherein the display includes an optical device positioned relative to the substrate to enable the observer to view the first image on the substrate through the optical device; the display displaying the second image in the optical device in order to spatially relate the second visible data in the second image to the first visible data in the first image.

2. The apparatus of claim 1, wherein the registration information includes a location on the substrate.

3. The apparatus of claim 1, wherein the registration information includes an orientation of the substrate.

4. The apparatus of claim 1 wherein the optical device is a lens.

5. The apparatus of claim 1 wherein the optical device is a semitransparent mirror.

6. The method of claim 1 wherein the second image is the same size as the first image.

7. The method of claim 1 wherein the second image is larger than the first image.

8. A method for displaying registered information using embedded data, comprising:

capturing a first image of a substrate having first visible data and embedded data embodied thereon;

decoding the embedded data to develop registration information;

retrieving second information from a storage location identified by the registration information; and displaying, on a display, a second image including second visible data representing the second information; and second image being positioned relative to the first image based on the registration information such that an observer sees the second visible data of the second image spatially related to the first visible data of the first image; wherein the display includes an optical device positioned relative to the substrate to enable the observer to view the first image on the substrate through the optical device; the display displaying the second image in the optical device in order to spatially relate the second visible data in the second image to the first visible data in the first image.

9. The method of claim 8, wherein the decoding step further comprises decoding the embedded data to identify a location on the substrate.

10. The method of claim 8, wherein the decoding step further comprises decoding the embedded data to identify a location on the substrate.

11. An apparatus for displaying registered information using embedded data, comprising:

an image capture device for capturing a first image of a substrate having first visible data and embedded data embodied thereon;

a decoder for decoding the embedded data to develop registration information;

a device for retrieving second information from a storage location identified by the registration information; and a display for displaying a second image including second visible data representing the second information; the second image being positioned relative to the first image based on the registration information such that an observer, by using the display, seed the first visible data of the first image and the second visible data of the second image spatially related to the first visible data of the first image wherein the first image having first visible data and the second image including second visible data are projected onto a projection surface such than an observer sees a composite image of the first and second visible data formed by the second image overlaid and registered with the first image.

12. A method for displaying registered information using embedded data, comprising:

capturing a first image of a substrate having first visible data and embedded data embodied thereon;

decoding the embedded data to develop registration information; and displaying a second image including second visible data; the second image being positioned relative to the first image based on the registration information such that an observer, by using a display, sees the first visible data of the first image and the second visible data of the second image spatially related to the first visible data of the first image; wherein the display includes an optical device positioned relative to the substrate to enable the observer to view the first image on the substrate through the optical device; the display displaying the second image in the optical device in order to spatially relate the second visible data in the second image to the first visible data in the first image.

* * * * *

UNITED STATES PATENT AND TRADEMARK OFFICE
CERTIFICATE OF CORRECTION

PATENT NO. : 6,880,755 B2
DATED : April 19, 2005
INVENTOR(S) : Matthew Gorbet et al.

It is certified that error appears in the above-identified patent and that said Letters Patent is hereby corrected as shown below:

<u>Title page,</u>
Item [73], Assignee, should read -- Xerox Corporation, Stamford, CT (US) --.

Signed and Sealed this

Twenty-first Day of March, 2006

JON W. DUDAS
*Director of the United States Patent and Trademark Office*